US012315281B2

(12) United States Patent
Arakawa

(10) Patent No.: US 12,315,281 B2
(45) Date of Patent: May 27, 2025

(54) IMAGE PROCESSING APPARATUS, IMAGE PROCESSING SYSTEM, CONTROL METHOD THEREOF, AND STORAGE MEDIUM

(71) Applicant: CANON KABUSHIKI KAISHA, Tokyo (JP)

(72) Inventor: Junya Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 17/710,784

(22) Filed: Mar. 31, 2022

(65) Prior Publication Data
US 2022/0319218 A1 Oct. 6, 2022

(30) Foreign Application Priority Data
Apr. 5, 2021 (JP) .................................. 2021-064177

(51) Int. Cl.
G06V 30/414 (2022.01)
G06V 30/146 (2022.01)
G06V 30/42 (2022.01)

(52) U.S. Cl.
CPC .......... *G06V 30/414* (2022.01); *G06V 30/147* (2022.01); *G06V 30/42* (2022.01)

(58) Field of Classification Search
CPC .... G06V 30/10; G06V 30/412; G06V 30/414; G06V 30/42; G06V 30/147; G06V 30/1444
See application file for complete search history.

(56) References Cited

U.S. PATENT DOCUMENTS

| 6,400,845 B1* | 6/2002 | Volino | G06V 30/1444 382/176 |
| 2010/0171999 A1 | 7/2010 | Namikata et al. | H04N 1/46 |
| 2012/0314954 A1* | 12/2012 | Moore | H04N 1/32144 235/375 |
| 2019/0087444 A1 | 3/2019 | Arakawa | G06T 1/00 |
| 2021/0343030 A1* | 11/2021 | Sagonas | G06T 7/30 |

(Continued)

FOREIGN PATENT DOCUMENTS

JP H07-6203 1/1995

*Primary Examiner* — Margaret G Webb
(74) *Attorney, Agent, or Firm* — Venable LLP

(57) ABSTRACT

The image processing apparatus having a scan function and including: a memory storing a program; and a processor executing the program to set a property of a business form file by using results of character recognition processing for a business form image obtained by reading a business form; perform predetermined preprocessing before the character recognition processing for the business form image; and perform the character recognition processing for each character area within the business form image for which the preprocessing is performed, wherein as the preprocessing, first preprocessing performed as a default and second preprocessing performed additionally for improving accuracy of the character recognition processing exist and in the performing preprocessing, whether to perform the second preprocessing following the first preprocessing is determined based on information specifying contents of preprocessing to be performed, which is registered in advance for a past business form image similar to the business form image.

8 Claims, 17 Drawing Sheets

(56) References Cited

U.S. PATENT DOCUMENTS

| | | | |
|---|---|---|---|
| 2022/0180113 A1* | 6/2022 | Patel | G06V 10/28 |
| 2022/0201141 A1 | 6/2022 | Arakawa | H04N 1/00 |
| 2022/0284215 A1* | 9/2022 | Rastogi | G06F 16/9024 |

* cited by examiner

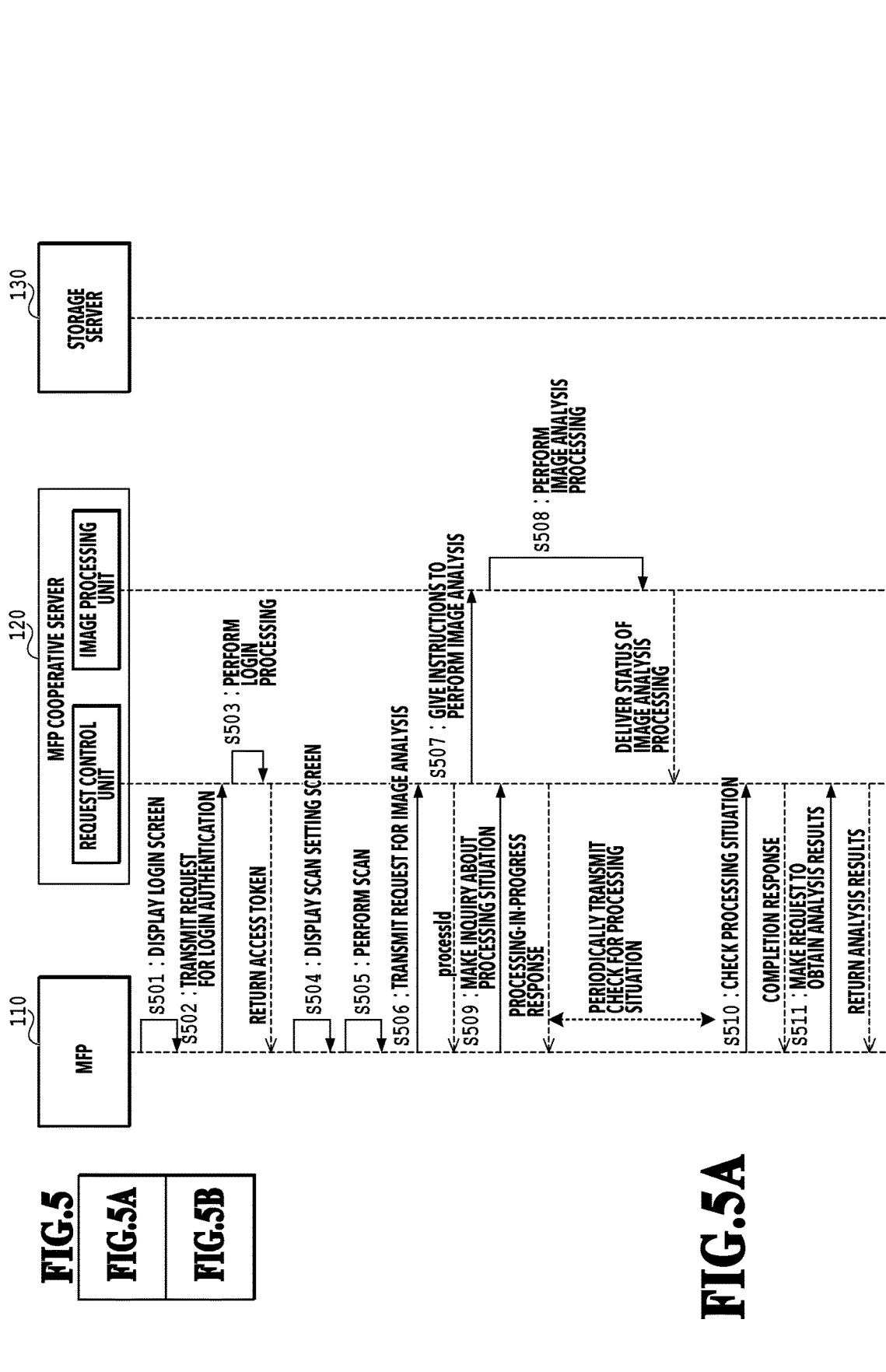

Scanned Business Form List — 700

- Transmit (702)
- Edit (703)
- Delete (704)

| Business Form ID (705) | Transmission Destination (706) | Status (707) | File Name (708) |
|---|---|---|---|
| 001 | Cloud Storage A | Untrained | |
| 002 | Cloud Storage A | Untrained | |
| 003 | Cloud Storage B /20200610 | Trained | Estimate Form_Shimomaruko Inc. |
| 004 | Cloud Storage A | Untrained | |
| 005 | Cloud StorageB /20200615 | Trained | Estimate Form_Shinagawa Inc. |

```
{
  "matched": true,
  "formId": "aaaaaaaa-ffff-49ab-acf8-55558888eeee",
  "matchingScore": 0.745,
  "rectInfoArray": [
    {
      "key": "textRegion0",
      "score": 0..95,
      "region": {
        "rect": {
          "x": 50,
          "y": 580,
          "width": 200,
          "height": 70
        },
        "text": "Bill"
      }
    },
    {
      "key": "textRegion1",
      "score": 0.90,
      "region": {
        "rect": {
          "x": 300,
          "y": 580,
          "width": 200,
          "height": 70
        },
        "text": "ID9400"
      }
    }
  ],
  "metadataArray": [
    {
      "key": "name1",
      "keyType": "filename",
      "value": [
        "textRegion1"
      ]
    },
    {
      "key": "name2",
      "keyType": "foldername",
      "value": [
        "$date",
        "separator",
        "textRegion0"
      ]
    }
  ],
  "ocrResultArray": [
    {
      "rect": {
        "x": 230,
        "y": 190,
        "width": 230,
        "height": 70
      },
      "text": "Total: ¥9,000"
    },
        .
        .
        .
      OMITTED
  ]
}
```

FIG.8

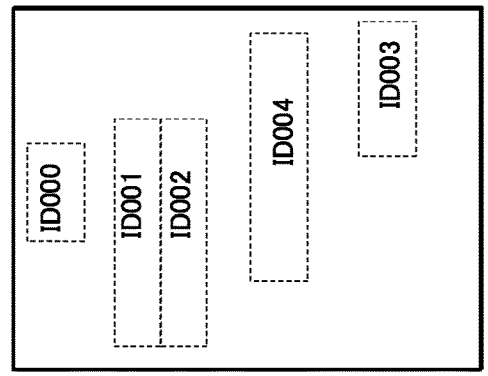
FIG.12C / FIG.12F
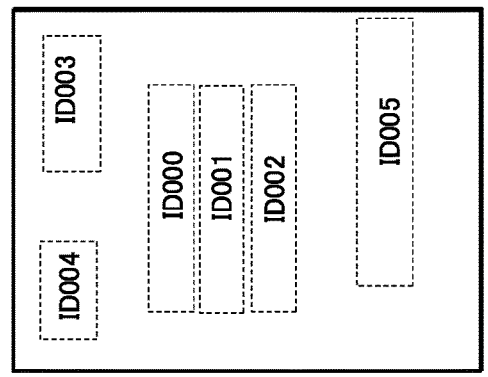
FIG.12B / FIG.12E
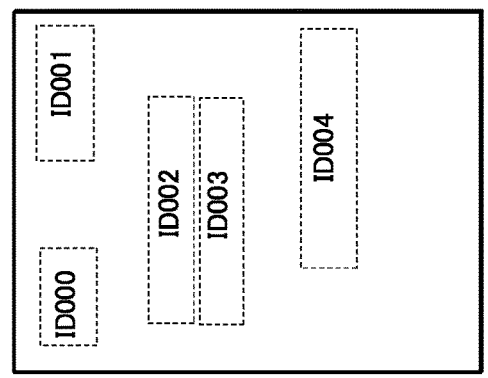
FIG.12A / FIG.12D

```
{
  "formId": "aaaaaaaa-ffff-49ab-acf8-55558888eeee",
  "rectInfoArray": [
    {
      "key": "textRegion0",
      "defaultProcessing": true,
      "additionalProcessing":{
      },
      "region": {
        "rect": {
          "x": 50,
          "y": 580,
          "width": 200,
          "height": 70
        }
      }
    },
    {
      "key": "textRegion1",
      "defaultProcessing": false,
      "additionalProcessing":{
        "procA":true,
        "procB":false,
        "procC":true,
      },
      "region": {
        "rect": {
          "x": 300,
          "y": 580,
          "width": 200,
          "height": 70
        }
      }
    }
  ],
  "metadataArray": [
    {
      "key": "name1",
      "keyType": "filename",
      "value": [
        "textRegion1"
      ]
    },
    {
      "key": "name2",
      "keyType": "foldername",
      "value": [
        "$date",
        "separator",
        "textRegion0"
      ]
    }
  ]
  "ocrResultArray": [
    {
      "rect": {
        "x": 280,
        "y": 190,
        "width": 230,
        "height": 70
      },
    },
        .
        .
        .
        OMITTED
  ]
}
```

FIG.13

| FIG.14A |
| FIG.14B |

IMAGE PROCESSING APPARATUS, IMAGE PROCESSING SYSTEM, CONTROL METHOD THEREOF, AND STORAGE MEDIUM

BACKGROUND OF THE INVENTION

Field of the Invention

The present invention relates to a technique for setting a property to a document file.

Description of the Related Art

Conventionally, as a management method of a document, a method of computerizing a paper document by performing a scan is widely used. Then, at the time of computerizing a document, performing character recognition processing for a scanned image obtained by scanning an image and using a recognized character string as a property, such as a file name, are also performed. At that time, based on a degree of reliability as an indication representing a probability of being correct of a recognized character, determining whether or not to adopt the recognized character string as a property, determining whether or not to transmit a document file automatically, and the like are also performed. Here, in a case where character recognition results are erroneous, a user modifies the property including an error by inputting a correct character string, but this modification work is troublesome to a user. Consequently, improvement in accuracy of character recognition processing is important.

In this regard, Japanese Patent Laid-Open No. H7-6203 has disclosed a method of improving accuracy of character recognition processing by performing predetermined preprocessing prior to character recognition processing.

However, in a case of the method of Japanese Patent Laid-Open No. H7-6203 in which predetermined preprocessing is performed each time, on a condition that an unnecessary process is included in the preprocessing, the time and cost spent for the processing are wasteful accordingly.

The technique of the present disclosure has been made in view of the above-described problem and an object is to improve accuracy of character recognition processing by optimizing preprocessing before character recognition processing.

SUMMARY OF THE INVENTION

The image processing apparatus of the present disclosure is an image processing apparatus having a scan function and including: a memory that stores a program; and a processor that executes the program to perform: setting a property of a business form file by using results of character recognition processing for a business form image obtained by reading a business form; performing predetermined preprocessing prior to the character recognition processing for the business form image; and performing the character recognition processing for each character area within the business form image for which the preprocessing has been performed, wherein as the preprocessing, first preprocessing that is performed as a default and second preprocessing that is performed additionally for improving accuracy of the character recognition processing exist and in the performing preprocessing, whether to perform the second preprocessing following the first preprocessing is determined based on information specifying contents of preprocessing to be performed, which is registered in advance for a past business form image similar to the business form image.

Further features of the present invention will become apparent from the following description of exemplary embodiments with reference to the attached drawings.

BRIEF DESCRIPTION OF THE DRAWINGS

FIG. 5 is a diagram showing the relationship of FIGS. 5A and 5B;

FIGS. 5A and 5B are totally a sequence diagram showing a flow of processing of the present system;

FIG. 7A and FIG. 7B are diagrams showing an example of a Scanned Business Form List screen and an example of Edit Screen, respectively;

FIG. 8 is a diagram showing an example of a data structure of analysis results;

FIG. 12A to FIG. 12F are diagrams showing an example of matching processing;

FIG. 13 is a diagram showing an example of a data structure of business form information for registration;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
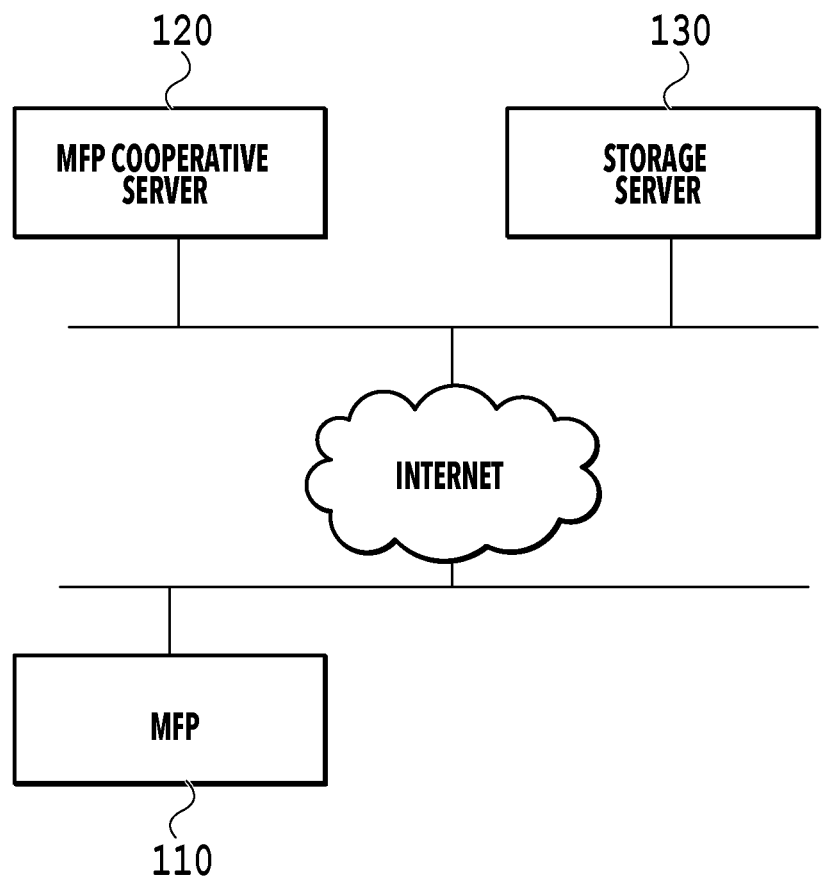
FIG. 1 is a diagram showing a general configuration of the present system.

FIG. 1 is a diagram showing the general configuration of an image processing system according to the present embodiment. The image processing system includes an MFP (Multifunction Peripheral) 110 and server apparatuses 120 and 130 that provide cloud services on the internet. The MFP 110 is connected with the server apparatuses 120 and 130 via the internet so as to be capable of communication.

The MFP 110 is an example of an information processing apparatus having the scan function. The MFP 110 is a multifunction peripheral having a plurality of functions, such as the print function and the BOX store function, in addition to the scan function. Both the server apparatuses 120 and 130 are each an example of an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (in the following, called "storage services") to store a file that is sent via the internet, provide a stored file in response to a request from a web browser, such as a client PC (not shown schematically), and so on. In the present embodiment, the server apparatus 120 that provides the MFP cooperative service is called "MFP cooperative server" and the server apparatus 130 that provides the storage service is called "storage server".

The configuration of an image processing system shown in FIG. 1 is an example and the configuration is not limited to this. For example, it may also be possible for the MFP 110 to have the functions of the MFP cooperative server 120 as well. Further, the MFP cooperative server 120 may be connected with the MFP 110 via a LAN (Local Area Network), not via the internet. Furthermore, it may also be possible to apply the present embodiment to a scene in which a scanned image of a document is transmitted by being attached to a mail by replacing the storage server 130 with a mail server that performs a mail distribution service.

<Hardware Configuration of MFP>

Figure 2:
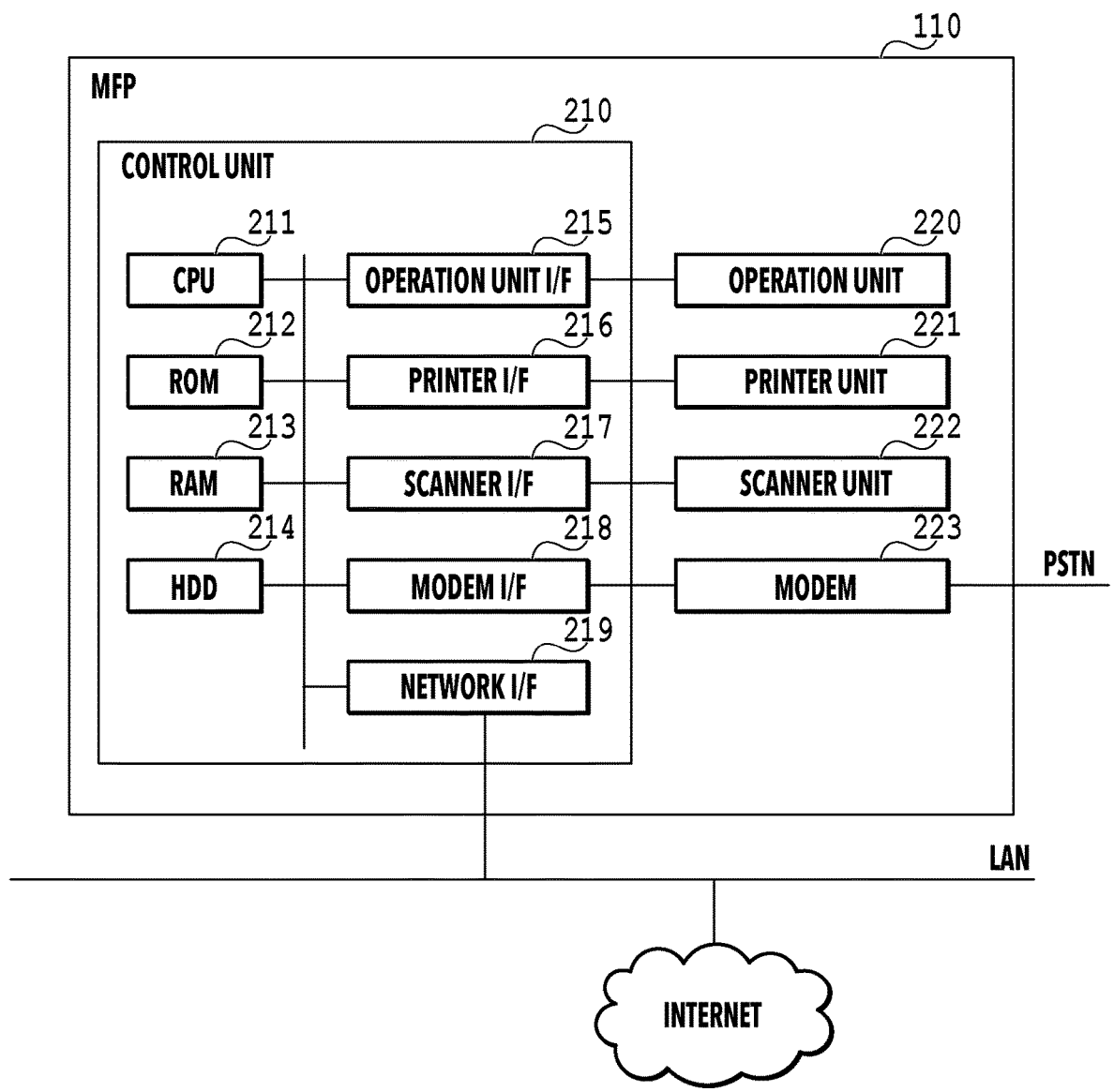
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CUP 211 reads a variety of control programs (programs corresponding to various functions shown in a software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in flowcharts, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 comprises a touch panel, a keyboard and the like and receives operations/inputs/instructions by a user. The touch operation to the touch panel includes the operation by a human finger and the operation by a touch pen. The printer I/F 216 is an interface that connects the printer unit 221 and the control unit 210. Image data to be printed is transferred from the control unit 210 to the printer unit 221 via the printer I/F 216 and printed on a printing medium, such as paper. The scanner I/F 217 is an interface that connects the scanner unit 222 and the control unit 210. The scanner unit 222 generates scanned image data by optically reading a document that is set on a document table or ADF (Auto Document Feeder), not shown schematically, and inputs the scanned image data to the control unit 210 via the scanner I/F 217. It is possible to print (copy and output) the scanned image data generated by the scanner unit 222 in the printer unit 221, store the data in the HDD 214, transmit the data to an external apparatus, such as the MFP cooperative server 120, as a file via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits the scanned image data to the MFP cooperative server 120, receives various kinds of data from the MFP cooperative server 120, and so on, by using the network I/F 219. The hardware configuration of the MFP 110 explained above is an example and the hardware configuration may be one that comprises another configuration as needed or may be one that does not have a part of the configuration.

<Hardware Configuration of Server Apparatus>

Figure 3:
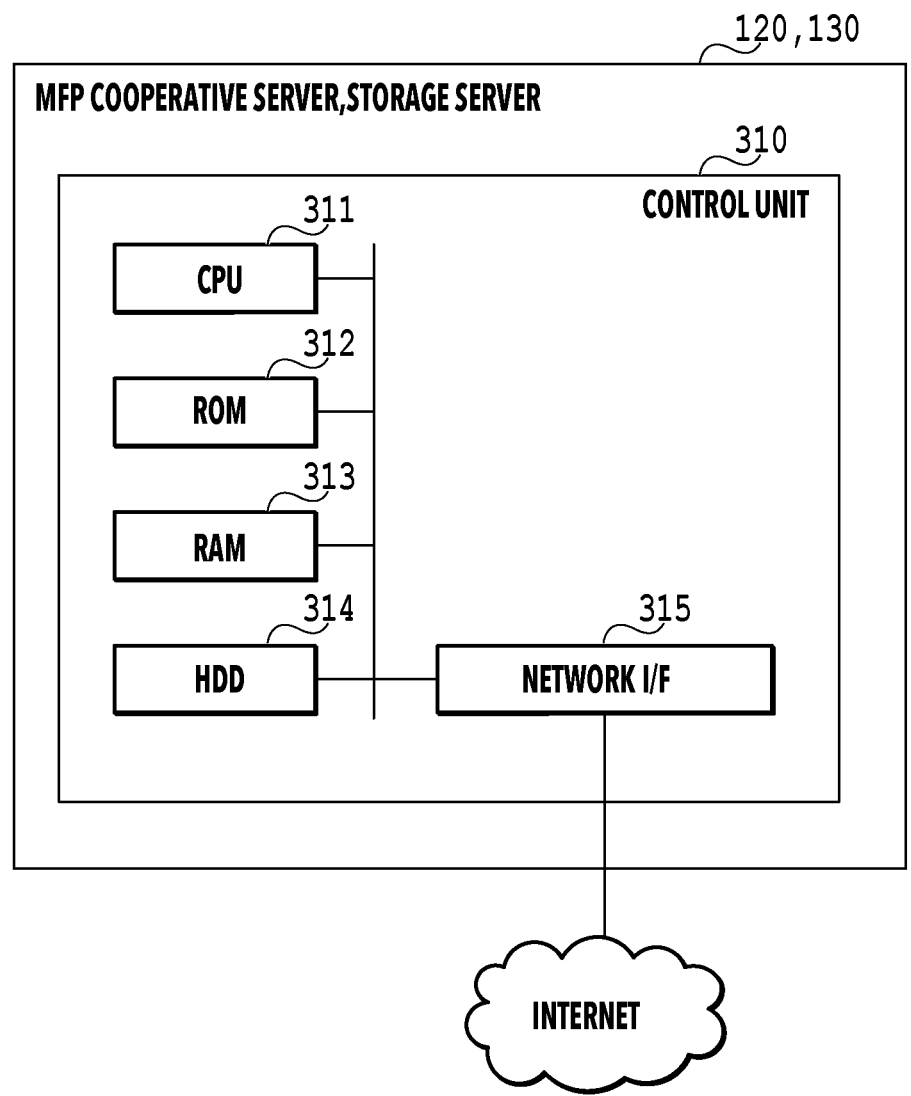
FIG. 3 is a block diagram showing a hardware configuration of an MFP cooperative server and a storage server.

FIG. 3 is a block diagram showing the hardware configuration of the MFP cooperative server 120 and the storage server 130. The MFP cooperative server 120 and the storage server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the storage server 130 receive requests for various kinds of processing from other apparatuses (MFP 110 and the like) via the network I/F 315 and return processing results in accordance with the requests.

<Software Configuration of Image Processing System>

Figure 4:
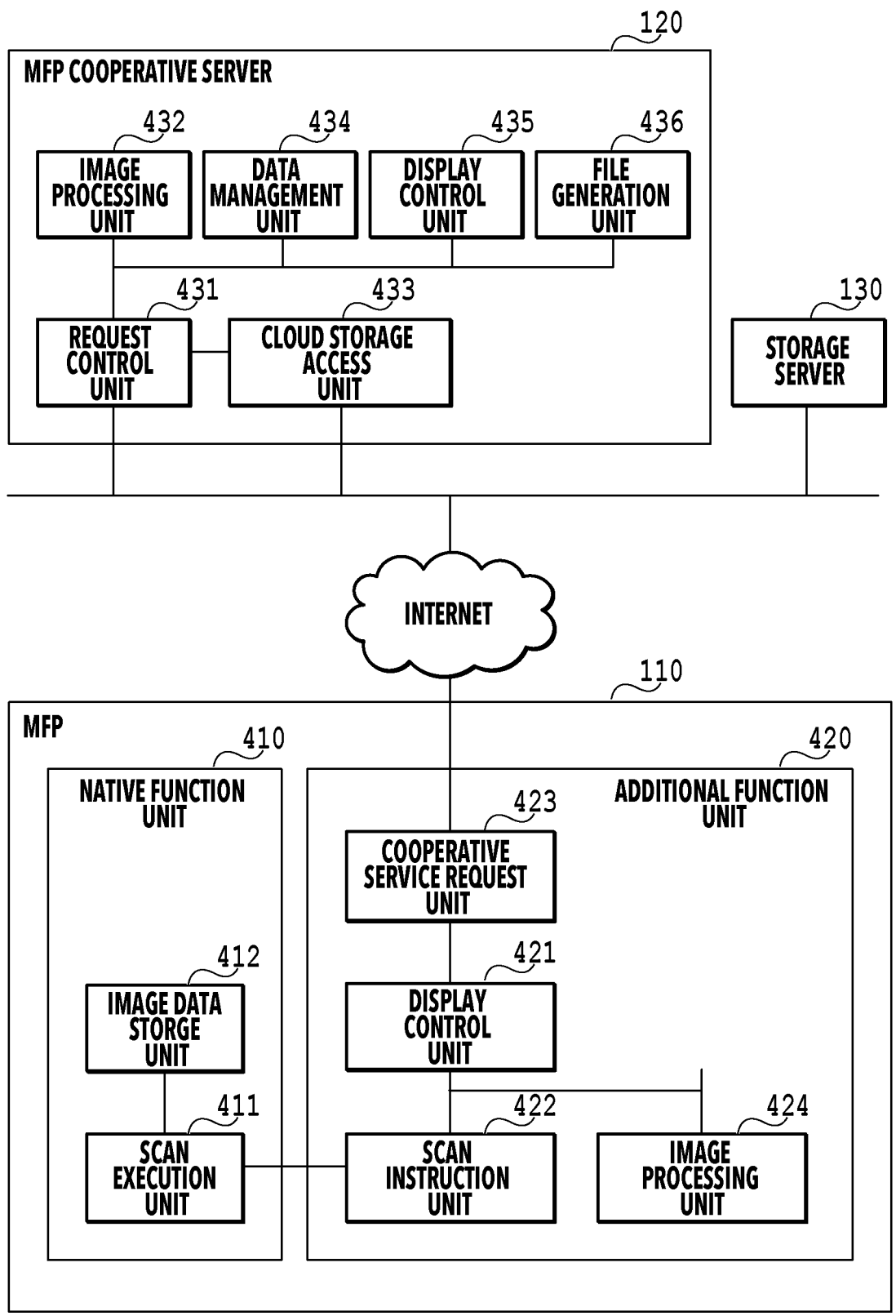
FIG. 4 is a block diagram showing a software configuration of the present system.

FIG. 4 is a block diagram showing the software configuration of the image processing system according to the present embodiment. In the following, the software configuration corresponding to the role of each of the MFP 110, the MFP cooperative server 120, and the storage server 130 configuring the image processing system is explained in order. In the following, explanation is given by narrowing the various functions of each apparatus to the functions relating to the processing from computerizing (filing) a document by performing a scan until storing it in the storage server 130.

«Software Configuration of MFP»

The function modules of the MFP 110 are roughly divided into two units, that is, a native function unit 410 and an additional function unit 420. While the native function unit 410 is an application provided as a standard one in the MFP 110, the additional function unit 420 is an application that is installed additionally in the MFP 110. The additional function unit 420 is an application based on Java (registered trademark) and it is possible to easily implement the addition of a function to the MFP 110. In the MFP 110, another additional application, not shown schematically, may be installed.

The native function unit 410 has a scan execution unit 411 and an image data storage unit 412. Further, the additional function unit 420 has a display control unit 421, a scan instruction unit 422, a cooperative service request unit 423, and an image processing unit 424.

The display control unit 421 displays a UI (User Interface) screen for receiving various user operations on a touch panel of the operation unit 220. The various user operations include, for example, inputting of login authentication information for accessing the MFP cooperative server 120, scan setting, giving instructions to start a scan, file name setting, giving instructions to store a file and the like.

The scan instruction unit 422 gives instructions to perform scan processing to the scan execution unit 411 along with scan setting information in accordance with the user operation performed on the UI screen. The scan execution unit 411 causes the scanner unit 222 to perform the document reading operation via the scanner I/F 217 and generates scanned image data in accordance with the instructions to perform scan processing from the scan instruction unit 422. The generated scanned image data is stored in the HDD 214 by the image data storage unit 412. At this time, the scan instruction unit 422 is notified of information on a scanned image identifier uniquely indicating the stored scanned image data. The scanned image identifier is a number, symbol, alphabetical letter and the like for uniquely identifying the image scanned in the MFP 110. The scan instruction unit 422 obtains, for example, the scanned image data that is the target to be filed from the image data storage unit 412 by using the above-described scanned image identifier. Then, the scan instruction unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, the communication protocol, such as REST and SOAP, is used.

The image processing unit 424 generates an image that is used on the UI screen displayed by the display control unit 421 by performing predetermined image processing for the scanned image data. Details of the predetermined image processing will be described later. It may also be possible for an apparatus (client PC and the like, not shown schematically) different from the MFP 110 to comprise the above-described additional function unit 420. That is, the system configuration may be one in which the client PC makes an analysis request for the scanned image obtained by the MFP 110, performs file name setting based on the analysis results, and so on.

«Software Configuration of Server Apparatus»

First, the software configuration of the MFP cooperative server 120 is explained. The MFP cooperative server 120 has a request control unit 431, an image processing unit 432, a cloud storage access unit 433, a data management unit 434, a display control unit 435, and a file generation unit 436. The request control unit 431 stands by in the state of being capable of receiving a request from an external apparatus. Then, the request control unit 431 instructs the image processing unit 432, the cloud storage access unit 433, the data management unit 434, the display control unit 435, and the file generation unit 436 to perform predetermined processing in accordance with received request contents. The image processing unit 432 performs image modification processing, such as rotation and inclination correction, in addition to analysis processing, such as character area detection processing, character recognition processing (OCR processing), similar document determination processing, and automatic transmission determination processing, for the scanned image data that is sent from the MFP 110. In the following, the character area that is detected from the scanned image is called "character area". Further, explanation is given by taking a business form, such as an estimate form and a bill, as an example of a target document and the scanned image of the business form is called "business form image". The cloud storage access unit 433 makes a request for processing to the storage server 130. The cloud service has made public a variety of interfaces for storing a file in the storage server, obtaining a stored file, and so on by using the protocol, such as REST and SOAP. The data management unit 434 stores user information, various kinds of setting data and the like, which are managed in the MFP cooperative server 120. The display control unit 435 receives a request from a web browser running on a PC or a mobile terminal (none of which is shown schematically) connected via the internet and returns screen configuration information (HTML, CSS and the like) necessary for the screen display. It is possible for a user to check the registered user information, change the scan setting, and so on via the screen that is displayed on the web browser. Upon receipt of instructions from the request control unit 431, the file generation unit 436 generates a document file including a scanned image. At that time, the file generation unit 436 sets a file name based on results of performing character recognition processing for the character string included in the scanned image.

Next, the software configuration of the storage server 130 is explained. The storage server 130 has a request control unit (not shown schematically), a file arrangement unit (not shown schematically), and a display control unit (not shown schematically). The request control unit (not shown schematically) stands by in the state of being capable of receiving a request from an external apparatus. Then, in the present embodiment, the request control unit (not shown schematically) instructs the file arrangement unit (not shown schematically) to store a received file and read a stored file in response to a request from the MFP cooperative server 120. Then, the request control unit (not shown schematically) returns a response in accordance with the request to the MFP cooperative server 120. The display control unit (not shown schematically) receives a request from a web browser running on a PC or a mobile terminal (none of which is shown schematically) connected via the internet and returns screen configuration information (HTML, CSS and the like) necessary for the screen display. It is possible for a user to check, obtain, delete, and so on a stored file via the screen that is displayed on the web browser.

<Flow of Entire Processing>

Figure 5B:
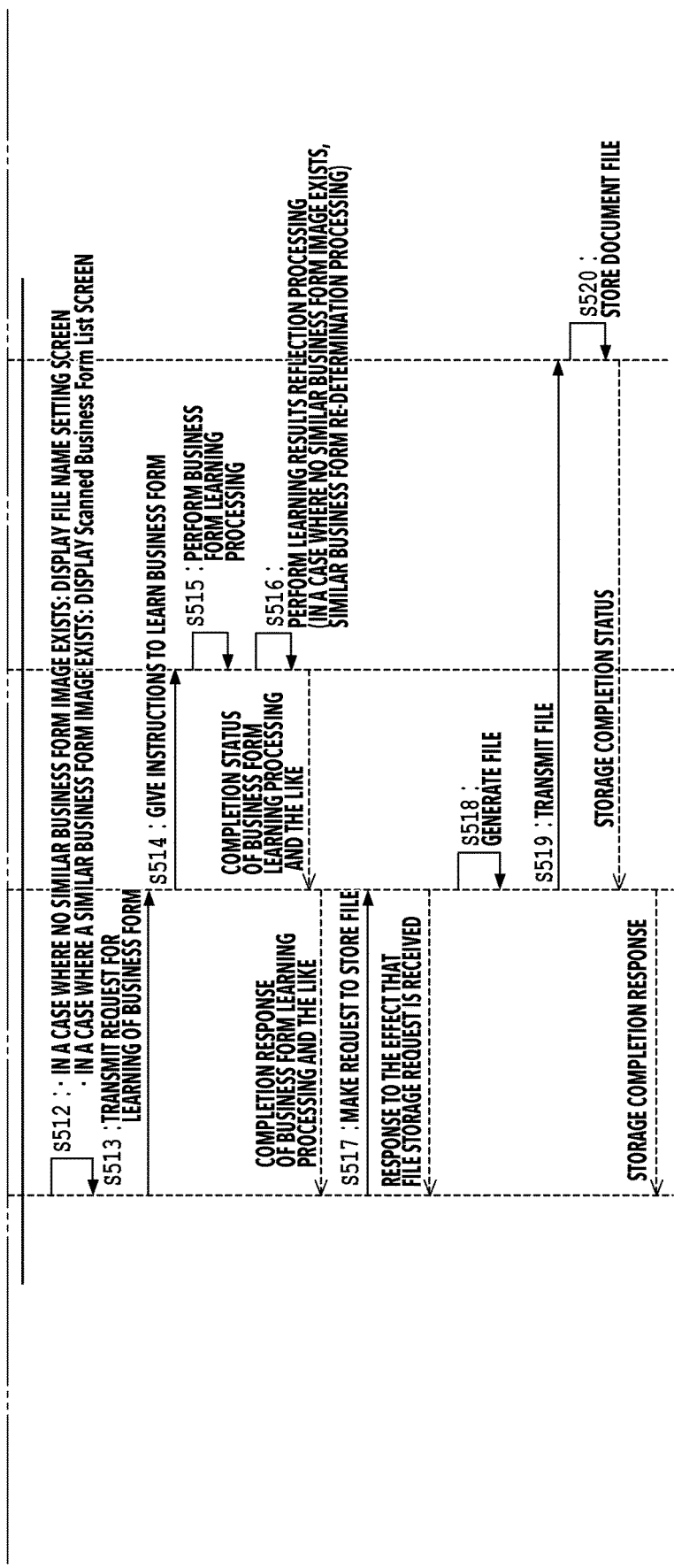

FIGS. 5A and 5B are totally a sequence diagram showing a flow of processing among the apparatuses in a case where a document (for example, business form, such as estimate form) is canned in the MFP 110 and the obtained canned image (for example, business form image) is filed and stored in the storage server. The sequence diagram in FIGS. 5A and 5B explains a case where a file name that is attached at the time of filing a scanned image is set, but it is possible to apply the sequence diagram in FIGS. 5A and 5B to properties in general, such as a folder path and metadata, in addition to a file name.

The MFP 110 displays, in the normal state, a main screen (not shown schematically) on which buttons for performing each function that is provided are arranged on a touch panel. As the premise, in a case where a dedicated application that scans and files a document and which is necessary for utilization of the cloud storage service is installed in the MFP 110, the MFP 110 displays a menu button (not shown schematically) on the main screen. In the following, along the sequence diagram in FIGS. 5A and 5B, the operations among the apparatuses are explained in a time series. In the following explanation, symbol "S" indicates a step.

At S501, the MFP 110 displays a UI screen (in the following, called "login screen") on which to input information on login authentication for accessing the MFP cooperative server 120 on the operation unit 220. On the login screen (not shown schematically), a "login button" (not shown schematically), an ID input field (not shown schematically), and a password input field (not shown schematically) are included.

It is assumed that a user inputs a user ID and a password, which are registered in advance, in the ID input field and the password input field, respectively, on the login screen and presses down the "log in" button. Then, at S502, the MFP 110 transmits a request for login authentication to the MFP cooperative server 120.

At S503, the MFP cooperative server 120 having received the request for login authentication performs authentication processing by using the user ID and the password included in the request. In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a login user is specified. In the present embodiment, it is assumed that at the same time the login to the MFP cooperative server 120 is completed, the login to the storage server 130 is also completed. Because of this, a user performs in advance association between the user ID for utilizing the MFP cooperative service and the user ID for utilizing the storage service via a web browser or the like of a PC (not shown schematically) on the internet. Due to this, in a case where the login authentication to the MFP cooperative server 120 succeeds, the login authentication to the storage server 130 is also completed at the same time and it is possible to omit the operation to log in to the storage server 130. Then, it is made possible for the MFP cooperative server 120 to deal with also a request relating to the storage service from a user who has logged in to the MFP cooperative server 120. Generally, it may be possible to perform the login authentication method by using a publicly known method (Basic authentication, Digest authentication, authentication using OAuth, and the like). Further, it is also possible to switch between performing additional preprocessing and not performing additional preprocessing, to be described later, in accordance with the scan accuracy of each MFP by utilizing the individual identification number of the MFP 110, which is obtained by this login authentication processing.

In a case where the login is completed, at S504, in the MFP 110, a UI screen for scan setting (in the following, called "scan setting screen") is displayed on the operation unit 220. On the scan setting screen (not shown schematically), a "start scan" button (not shown schematically), a color setting field (not shown schematically), and a resolution setting field (not shown schematically) exist. The "start scan" button is a button to give instructions to start scan processing for a document (in the present embodiment, a business form, such as an estimate form and a bill, is supposed) set on a document table. In the color setting field, the color mode at the time of scan is set. For example, it is made possible to designate one of alternatives, such as full color and monochrome. In the resolution setting field, the resolution at the time of scan is set. For example, it is made possible to designate one of alternatives, such as 600 dpi and 1,200 dpi. The color mode and the resolution are examples of the setting item and it is not necessary for all of these setting items to exist, or another setting item other than these may exist. Further, it may also be possible to limit the alternatives relating to the color mode and the resolution only to the setting values required in the storage service. A login user performs detailed condition setting as to the scan processing via the scan setting screen such as this.

It is assumed that a login user having completed the scan setting sets a scan-target document on the document table of the MFP 110 and presses down the "start scan" button. Then, at S505, the MFP 100 performs a scan for the document that is set on the document table. Due to this, scanned image data obtained by computerizing a paper document is generated.

At S506, the MFP 110 transmits the scanned image data that is the data including the image obtained by the above-described scan to the MFP cooperative server 120 along with an image analysis request, which is a request for analyzing the scanned image data.

At S507, in the MFP cooperative server 120 having received the image analysis request, the request control unit 431 instructs the image processing unit 432 to perform image analysis processing. At that time, the request control unit 431 returns a request ID ("processId") capable of uniquely specifying the received image analysis request to the MFP 110.

At S508, the image processing unit 432 having received the instructions to perform image analysis processing performs image analysis processing for the business form image relating to the image analysis request. In the image analysis processing, processing, such as default preprocessing, similar business form determination processing, additional preprocessing, and character recognition processing, is included. Details of the image analysis processing will be described later by using FIG. 9. Then, in a case of starting the image analysis processing, the image processing unit 432 delivers a status indicating the progress situation to the request control unit 431 in accordance with the progress situation of the image analysis processing.

While the image analysis processing (S508) is being performed, at S509, the MFP 110 periodically (for example, about every several hundred milliseconds to several milliseconds) checks the situation of the image analysis processing by using the above-described request ID (S509 to S510). This situation check is performed repeatedly until a response indicating that the image analysis processing is completed is obtained from the MFP cooperative server 120. Upon receipt of a request to check the situation of the image analysis processing, the request control unit 431 of the MFP cooperative server 120 checks the progress situation of the image analysis processing corresponding to the request ID. Then, in a case where the image analysis processing is not completed, the request control unit 431 returns a processing-in-progress response indicating that the analysis processing is being performed. On the other hand, in a case where the image analysis processing is completed, the request control unit 431 returns a completion response. In "status" of these responses, a character string indicating the current processing situation is input. Specifically, in a case where the processing is being performed in the MFP cooperative server 120 (processing-in-progress response), "processing" is input and in a case where the processing is completed (completion response), "completed" is input. There is a case where a character string indicating another status is input, such as "failed" on a condition that the processing has failed. Further, the completion response also includes information on a URL indicating the storage destination of the image analysis results, and the like.

In a case of obtaining the above-described completion response, at S511, the MFP 110 transmits a request to obtain the results of the image analysis processing to the MFP cooperative server 120 by using the URL indicating the storage destination of the image analysis results included in the completion response. Upon receipt of the request, the request control unit 431 of the MFP cooperative server 120 returns the results of the image analysis processing to the MFP 110. In the results of the image analysis processing at this time, the results of character area extraction for the target image, the results of similar business form determination processing, and the results of character cognition processing are included. Then, the MFP 110 obtains the results of the image analysis processing.

Figure 6:
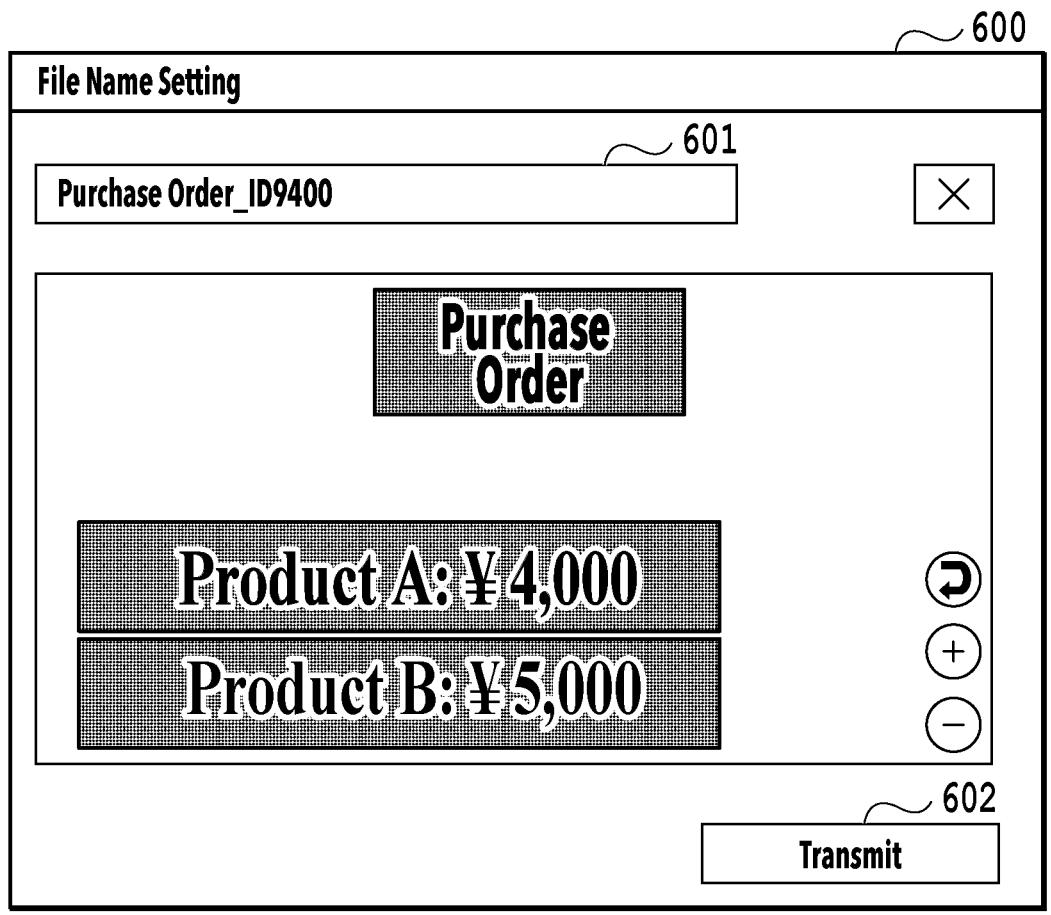
FIG. 6 is a diagram showing an example of a File Name Setting screen.

In a case where it is determined that a similar business form image that is similar to the target image does not exist by the similar business form determination processing, at S512, the MFP 110 displays a File Name Setting screen 600 (see FIG. 6), to be described later, for setting a file name of the target image on the operation unit 220. FIG. 6 is a diagram showing an example of a file name setting screen that is displayed at the time of a user setting a file name manually for the target image for which no similar business form image exists. For example, in a case where a purchase order as shown in FIG. 12C, to be described later, is scanned and image analysis processing is performed, the business form of the purchase order as shown in FIG. 6 is displayed. On the File Name Setting screen 600, a file name setting field 601 and a "Transmit" button 602 exist. Further, a button other than this may be displayed as needed. Then, a user appropriately sets a file name manually that is displayed in the file name setting field 601 and then presses down the "Transmit" button 602. In a case where the "Transmit" button 602 is pressed down, the processing advances to S517 through steps of S513 to S516, to be described later. On the other hand, in a case where it is determined that a similar business form image exists, the MFP 110 displays a scanned business form list screen (see FIG. 7A) on the operation unit 220. Details of the scanned business form list screen will be described later by using FIG. 7A and FIG. 7B. In a case where there is no error in file names displayed in a File Name field 708 within a business form list display area 701, a user presses down a "Transmit" button 702. On the other hand, in a case where there is an error in the file names displayed in the File Name field 708, a user selects a business form ID whose file name the user desires to modify and pressed down an "Edit" button 703. In a case where the user presses down the "Edit" button 703, the screen transitions from a Scanned Business Form List screen 700 into Edit Screen 710 (see FIG. 7B). In a case where Edit Screen 710 is displayed on the operation unit 220 of the MFP 110, the user appropriately modifies the file name manually and presses down a "Complete Edit" button 713. In a case where the user presses down the "Complete Edit" button 713, the screen transitions again into the Scanned Business Form List screen 700. Then, the user presses down the "Transmit" button 702. In a case where the "Transmit" button 702 is pressed down, the processing advances to S517 through steps of S513 to S516, to be described later.

It is assumed that a user presses down the "Transmit" button 702 (in a case where no similar business form image exists, the "Transmit" button 602). Then, at S513, the MFP 110 transmits a learning request for causing information relating to a character area used for setting a file name to be learned and information relating to the character area to the MFP cooperative server 120. In the information relating to the character area, the results of character recognition processing performed for all the character areas within the target image, arrangement information on the character area used for setting a file name, and character strings before and after modification in a case where a user has edited (modified) the file name are included. Further, in a case where a similar business form image similar to the target image exists, in the information relating to the character area, the type of the preprocessing that is performed prior to the character recognition processing is included.

In a case of having received the above-described learning request, at S514, the request control unit 431 of the MFP cooperative server 120 gives instructions to perform learning for causing the information relating to the character area to be learned.

At S515, the image processing unit 432 performs business form learning processing for learning the information relating to the character area. Details of the business form learning processing will be described later by using FIG. 10.

In a case where a similar business form image exists, at S516, the image processing unit 432 causes the learning results (for example, information such as for which character area, the additional preprocessing should be performed) learned by the business form learning processing to be reflected automatically in the similar business form image. In the following, the processing to cause the learning results to be reflected automatically in the similar business form image is called "learning results reflection processing". On the other hand, in a case where no similar business form image exists, the image processing unit 432 performs the similar business form determination processing again for the target image for which it has not been possible to extract a necessary character area for setting a file name. In the following, the similar business form determination processing that is performed again at this step is called "similar business form re-determination processing". Then, in a case where the business form learning processing and the learning results reflection processing (in a case where no similar business form image exists, similar business form re-determination processing) are completed, the image processing unit 432 delivers a completion status indicating that the business form learning processing and the learning results reflection processing are completed to the request control unit 431. Then, upon receipt of the completion status, the request control unit 431 returns a completion response indicating that the business form learning processing and the learning results reflection processing (in a case where no similar business form image exists, similar business form re-determination processing) are completed to the MFP 110.

In a case of obtaining the above-described response, at S517, the MFP 110 transmits a request to generate a document file relating to the target image and transmit the document file to and store the document file in the storage server 130 to the MFP cooperative server 120. In the following this request is called "file storage request". The request control unit 431 of the MFP cooperative server 120, which has received this file storage request, returns a response indicating that the "file storage request" has been received normally to the MFP 110. Upon receipt of the response, the MFP 110 terminates the processing and the display of the scan setting screen is returned (S504).

At S518, the MFP cooperative server 120 obtains information on the file format from the scan setting registered in advance and files the target image (generates a document file relating to the target image) in accordance with the file format. For example, in a case where the target image is a business form image, such as an estimate form, a business form file relating to the business form image is generated.

At S519, the MFP cooperative server 120 transmits the generated document file to the storage server 130.

At S502, the storage server 130 receives and stores the document file transmitted from the MFP cooperative server 120. Then, in a case where the storage of the document file is completed, the storage server 130 returns a status indicating that the storage of the document file is completed to the MFP cooperative server 120. Then, upon receipt of the status indicating that the storage of the document file is completed, the request control unit 431 of the MFP cooperative server 120 transmits a "storage completion response" indicating that the storage of the document file is completed to the MFP 110. The above is a rough flow of the processing of the entire image processing system.

<Scanned Business Form List Screen>

Figure 7B:
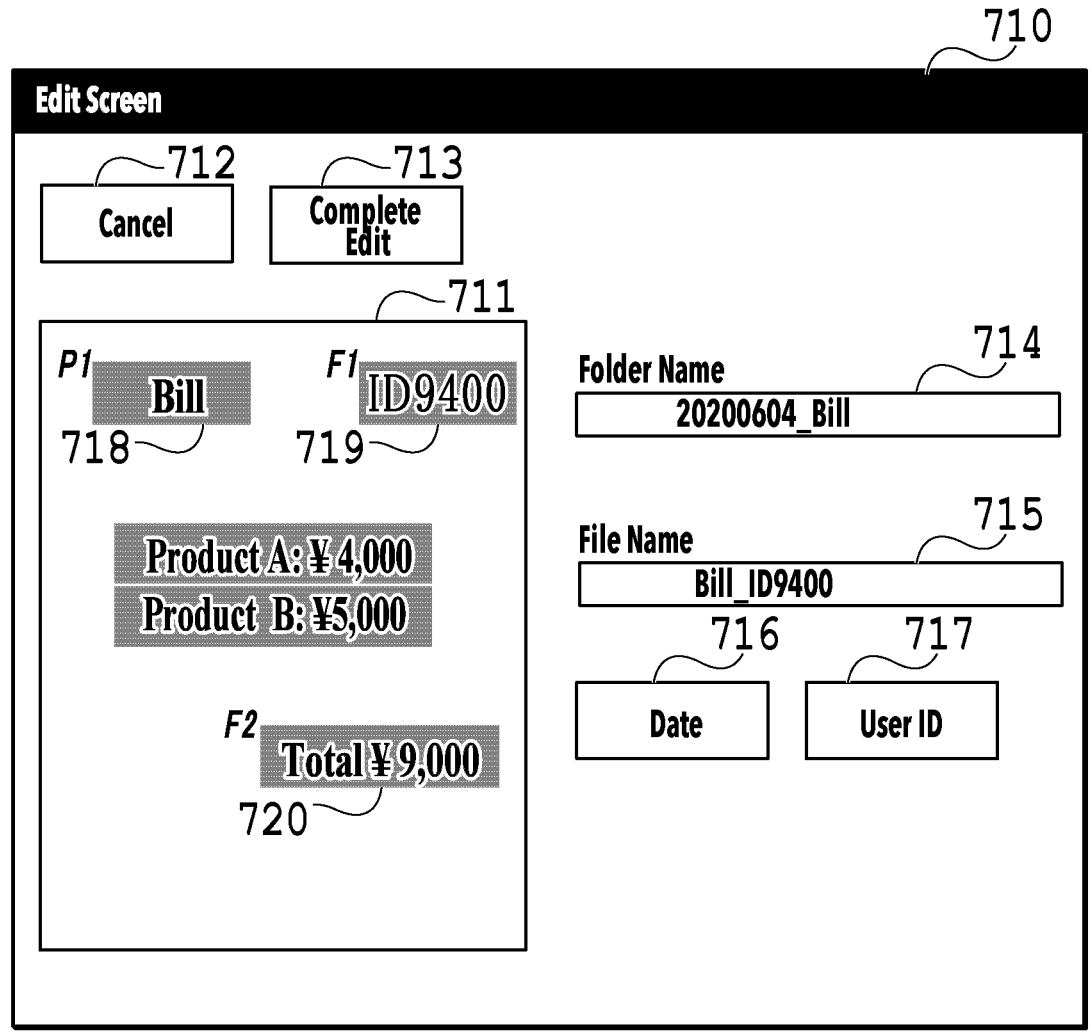

FIG. 7A and FIG. 7B are each a diagram showing an example of a screen that is displayed by the MFP 110 or a client PC (not shown schematically). First, the Scanned Business Form List screen 700 is explained. FIG. 7A is a diagram showing an example of the scanned business form list screen. On this screen, it is possible to browse a list of business forms for which the scan and the image analysis processing have been completed and before being transmitted to the storage server 130. Further, this screen includes the business form list display area 701, the "Transmit" button 702, the "Edit" button 703, and a "Delete" button 704. In the following each component constituting the Scanned Business Form List screen 700 is explained.

The business form list display area 701 is an area in which a list of images of business form images for which the scan of business forms has been performed and the image analysis processing (S508) has been completed is displayed. The business form list display area 701 consists of a Business Form ID field 705, a Transmission Destination field 706, a Status field 707, and the File Name field 708. In the Business Form ID field 705, a business form ID, which is an identifier for uniquely identifying a business form, is displayed. In the Transmission Destination field 706, the name of the storage server 130 in which the document file is stored and the name of the folder in which the document file is stored are displayed. For example, "Cloud storage B" displayed in the Transmission Destination field 706 of the business form ID "003" is the name of the storage server 130 in which the document file relating to the business form ID "003" is stored. Then, "20200610" displayed in the Transmission Destination field 706 of the business form ID "003" is the folder name of the folder in which the document file relating to the business form ID "003" is stored. In the Status field 707, the determination results of the similar business form determination processing that has been performed for the target image are displayed and one of "Unlearned" and "Learned" is displayed. "Unlearned" indicates that it has been determined that no similar business form image exists. On the other hand, "Learned" indicates that it has been determined that a similar business form image exists. The File Name field 708 displays the file name that is set to the document file relating to the target image. Normally, in a case where the Status field 707 is "Unlearned", the File Name field 708 is blank because of the state where no file name is set. On the other hand, in a case where the Status field 707 is "Learned", the file name that is automatically set by utilizing the results of character recognition processing is displayed. In a case where a user modifies the file name, the modified file name is displayed in the File Name field 708 irrespective of the results of character recognition processing. Similarly, as regards the folder name that is displayed in the Transmission Destination field 706, in a case where the Status field 707 is "Unlearned", the Transmission Destination field 706 corresponding to the folder name is blank because of the state where no folder name is set. On the other hand, in a case where the Status field 707 is "Learned", the folder name that is set automatically by utilizing the results of character recognition processing is displayed. In a case where a user modifies the folder name, the modified folder name is displayed in the Transmission Destination field 706 irrespective of the results of character recognition processing.

The "Transmit" button 702 is a button for transmitting a document file to the storage server 130. In a case where a user selects an arbitrary document file from among the document files displayed in the business form list display area 701 and presses down the "Transmit" button 702, the document file selected by the user is transmitted to the storage server 130 displayed in the Transmission Destination field 706. In a case where the transmission of the document file is completed normally, the document file relating to the transmitted business form ID is deleted from the list. The "Edit" button 703 is a button for transitioning into Edit Screen 710. In a case where a user selects an arbitrary document file from among the document files displayed in the business form list display area 701 and presses down the "Edit" button 703, the screen transitions into Edit Screen 710 for modifying the file name of the document file selected by the user. The "Delete" button 704 is a button for performing deletion of a document file. In a case where a user selects an arbitrary document file from among the document files displayed in the business form list display area 701 and presses down the "Delete" button 704, it is possible to delete the document file selected by the user.

<Edit Screen>

Following the above, Edit Screen 710 is explained. FIG. 7B is a diagram showing an example of an edit screen. In a case where the above-described "Edit" button 703 is pressed down, the Scanned Business Form List screen 700 transitions into Edit Screen 710. Edit Screen 710 is a screen on which a user modifies one of a file name and a folder name. Edit Screen 710 consists of a scanned image display area 711, a "Cancel" button 712, the "Complete Edit" button 713, a folder name input field 714, a file name input field 715, a "Date" button 716, and a "User ID" button 717. In the following, each component constituting Edit Screen 710 is explained.

In the scanned image display area 711, a business form image relating to a business form ID selected by a user is displayed and a character area in the business form image is displayed in gray, which is the background color. Further, an alphabetical letter displayed at the top left of each character area indicates as which property in a similar business form image, the character string displayed in the character area is utilized at the time of the property of the similar business form image the most similar to the target image being set. Then, a numeral displayed at the top left of each character area indicates as what number character string, the character string displayed in the character area is utilized at the time of the property of the similar business form image the most similar to the target image being set. For example, a symbol "P1" at the top left of a character area 718 indicates that the character string is utilized as the first character string of the folder name of the similar business form image at the time of the property of the similar business form image the most similar to the business form image of the business form relating to the business form ID 9400 selected by a user being set. Further, a symbol "F1" at the top left of a character area 719 indicates that the character string is utilized as the first character string of the file name of the above-described similar business form image. Furthermore, a symbol "F2" at the top left of a character area 720 indicates that the character string is utilized as the second character string of the file name of the above-described similar business form image.

The "Cancel" button 712 is a button for invalidating the modification results in the folder name input field 714 and the file name input field 715. In a case where a user presses down the "Cancel" button 712, the modification results in the folder name input field 714 and the file name input field 715 are invalidated and Edit Screen 710 transitions into the Scanned Business Form List screen 700. The "Complete Edit" button 713 is a button for settling the modification results in the folder name input field 714 and the file name input field 715. In a case where a user presses down the "Complete Edit" button 713, the modification results in the folder name input field 714 and the file name input field 715 are settled and Edit Screen 710 transitions into the Scanned Business Form List screen 700.

In the folder name input field 714, the folder name of the folder that stores the modification-target business form image is displayed. By utilizing the results of the character recognition processing performed for the similar business form image the most similar to the modification-target business form image, the character string whose probability of being as the folder name is the highest is input in advance. In a case where a user modifies the folder name, the user appropriately inputs a character string the user desires to use as the folder name manually. For example, in this case, by pressing down the folder name input field 714 and selecting the character area in which the character string the user desires to use as the folder name is displayed, it is possible to input the character string displayed in the selected character area as the folder name. Further, in a case where a user presses down the "Date" button 716, to be described later, it is possible to input the date on which the business form relating to the target image is scanned. Then, in a case where a user presses down the "User ID" button 717, to be described later, it is possible to input the user ID of the login user who has logged in to the present system and is performing the modification work. In a case where there is a plurality of character strings that is input in the folder name input field 714, those character strings are displayed in the state of being connected by a delimiter (for example, "_" (under bar). In the example in FIG. 7B, first, by a user pressing down the "Date" button 716, the date on which the user performs the scan work of this time is set as the first character string. Then, next, by the user selecting the character area 718, a character string of "Bill" is input as the second character string. Due to this, in the folder name input field 714, the date on which the scan work is performed and the character string "Bill" are input as "20200604_Bill", both character stings being connected by a delimiter.

In the file name input field 715, the file name of the modification-target business form image is displayed. By utilizing the results of the character recognition processing performed for the similar business form image the most similar to the modification-target business form image, the character string whose probability of being as the file name is the highest is input in advance. In a case where a user modifies the file name, the user appropriately inputs a character string the user desires to use as the file name manually. For example, in this case, by pressing down the file name input field 715 and selecting the character area in which the character string the user desires to use as the file name is displayed, it is possible to input the character string displayed in the selected character area as the file name. Further, in a case where a user presses down the "Date" button 716, to be described later, it is possible to input the date on which the business form relating to the target image is scanned. Then, in a case where a user presses down the "User ID" button 717, to be described later, it is possible to input the user ID of the login user whose has logged in to the present system and is performing the modification work. In a case where there is a plurality of character strings that is input in the file name input field 715, those character strings are displayed in the state of being connected by a delimiter (for example, "_" (under bar). In the example in FIG. 7B, by utilizing the results of the character recognition processing performed in the past, "Bill" is input in advance as the first character string of the file name. Then, next, by the user selecting the character area 719 next, "ID9400" is input as the second character string of the file name. Due to this, in the file name input field 715, the character string "Bill" and the character string "ID9400" are input as "Bill_ID9400", both character strings being connected by a delimiter.

The "Date" button 716 is a button for inputting the date on which the business form relating to the target image is scanned. At the time of modifying a folder name or a file name, in a case where a user presses down the "Date" button 716, the date on which the business form relating to the target image is scanned is input. Further, this date is used as metadata. The "User ID" button 717 is a button for inputting the user ID of the user who has logged in to the present system and is performing the modification work. At the time of modifying a folder name or a file name, in a case where the user presses down the "User ID" button 717, the user ID of the user who is performing the modification work of this time is input. Further, this user ID is used as metadata.

<Data Structure of Analysis Results>

FIG. 8 is a diagram showing an example of a data structure in results of image analysis processing, which is generated by the image processing unit 432 in the present system. In "matched", a value indicating whether or not a similar business form image similar to a target image exists in the similar business form determination processing is stored. In "formId", in a case where a similar business form image similar to the target image exists, a value uniquely indicating the type of the business form relating to the target image is stored. On the other hand, in a case where a similar business form image similar to the target image does not exist, a new value is issued and the new value indicating the type of a new business form is stored. In "matchingScore", in a case where a similar business form image similar to the target image exists, a value indicating to what extent they are similar is stored. For the value of "matchingScore", the degree of matching between arrangement information on the character area in the target image and arrangement information on the character area in the similar business form image similar to the target image is indicated by a real value between 0 and 1. The larger the value, the more similar the target image is to the image scanned in the past. In "text" of "rectInfoArray", coordinate information on the character area whose part is specified to be overlapped and the character string in the character area are stored. For example, it is assumed that a business form was scanned in the past and a file name was set by using "Bill" and "ID9631" and the input results were learned. After that, in a case where it is determined that, as a result of scanning the business form this time and performing the similar business form determination processing, the business form is similar to the target image of this time, below "rectInfoArray", the arrangement information on the character area that is input this time is stored as automatically input-target information. First, from the information stored in the data management unit 434 of the MFP cooperative server 120, the character areas in the target image corresponding to the character areas of "Bill" and "ID9631" set in the past are specified. The corresponding character areas are specified by combining entire position adjustment and partial position adjustment. Then, the coordinate information on the corresponding character areas and the characters are stored in "text" described after "rectInfoArray". In this example, to "Bill", the same character string "Bill" corresponds and to "ID9631", "ID9400" corresponds (see FIG. 12, to be described later). In "key", a value uniquely indicating the character area that is used for automatic input is stored. In "score", a value indicating a degree of reliability, which is an indication indicating a probability of being correct of the results for the character recognition processing, is stored. The degree of reliability is indicated by a real value between 0 and 1. The larger real value means that the probability of being correct of the results of the character recognition processing is higher. In "region", coordinate information on the character area and characters extracted as a result of performing the character recognition processing are stored. Here, "rect" indicates coordinates of one extracted character area, "x" indicates the X-coordinate of the top left of the area, "y" indicates the Y-coordinate of the top left of the area, "width" indicates the number of pixels in the X-direction of the area, "height" indicates the number of pixels in the Y-direction of the area, and "text" indicates the characters extracted as a result of performing the character recognition processing for the character area of "rect" are stored. In "metadataArray", information indicating the order of the character area that is used as a file name for automatic input and at which position the delimiter is inserted is stored. In a case where information including a property, such as metadata, is set other than a file name, necessary information is added to "rectInfoArray" and "metadataArray". In "key", a value uniquely indicating the setting value that is set to the target image is stored. In "keyType", a value indicating the type of the setting value of "key" is stored. In a case of being used for a file name, "key" is "name1" and "keyType" is "filename". In "value", information on the character area used as the value of "key" and the delimiter is stored. The example of "key": "name1" shown in FIG. 8 shows that the character string in the area having "key" of "textRegion1" in "rectInfoArray" is utilized as a file name. In the example of "key": "name2" shown in FIG. 8, "$date" means that the date on which the scan is performed is input to the file name as metadata and "separator" means a delimiter. That is, this example shows that the date on which the scan is performed, the delimiter, and the character string displayed in the area having "key" of "rectRegion0" are utilized in this order as the folder name. In "ocrResultArray", coordinate information on all the character areas of the target image and the results of performing the character recognition processing for the character areas are stored. The example in FIG. 8 shows coordinate information on the character area and "total: ¥9,000", which is the results of performing the character recognition processing for the character area, as one example of the results of performing the character recognition processing. The results of the character recognition processing for the second and subsequent character areas are omitted. Here, "rect" indicates coordinates of one extracted character area, "x" indicates the X-coordinate of the top left of the character area, "y" indicates the Y-coordinate of the top left of the character area, "width" indicates the number of pixels in the X-direction of the character area, "height" indicates the number of pixels in the Y-direction of the character area, and "text" indicates the results of the character recognition processing performed for the character area of "rect". On the other hand, for the character area for which the character recognition processing has not been performed, the results of the character recognition processing are not stored.

<Details of Image Analysis Processing>

Figure 9:
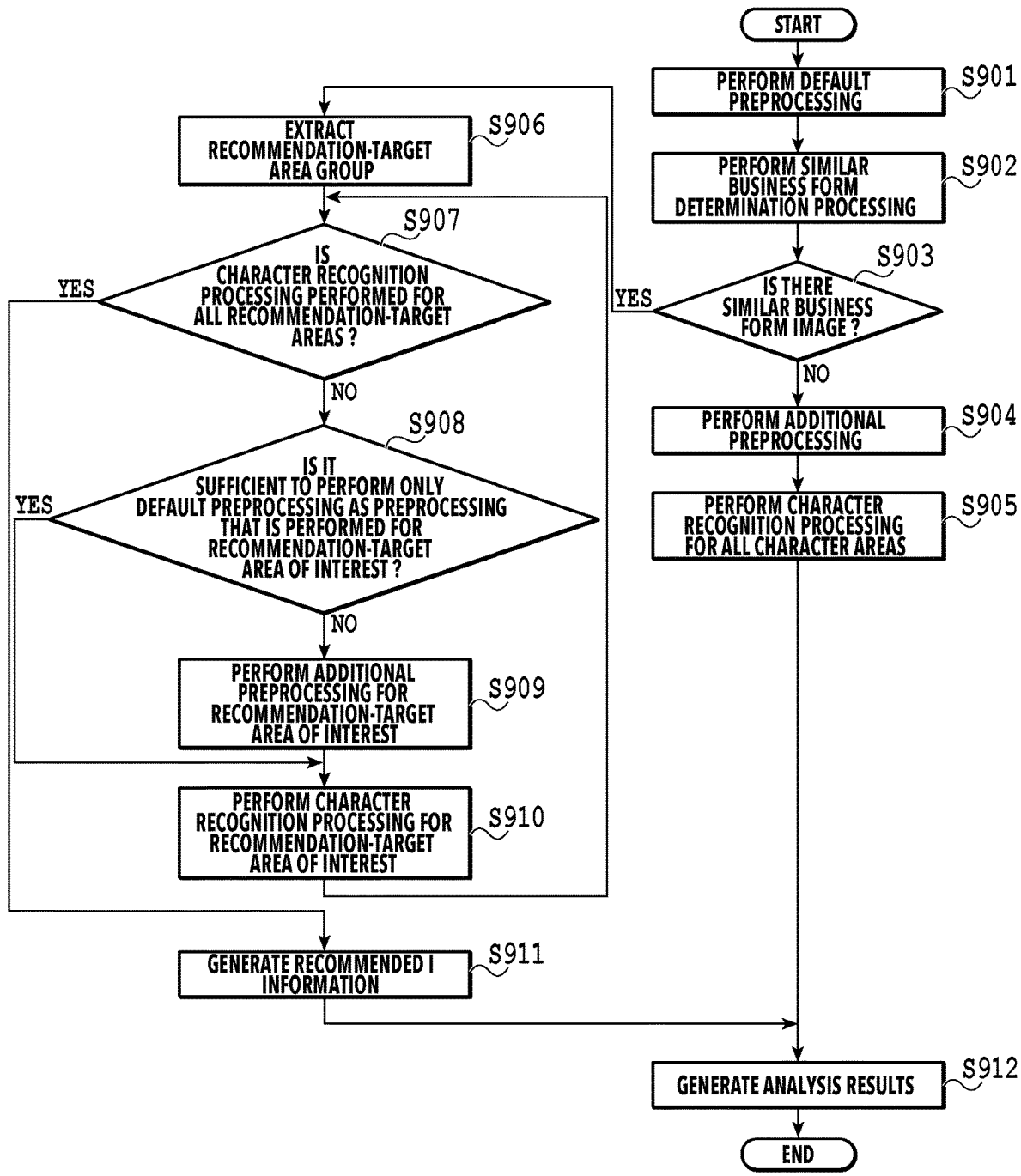
FIG. 9 is a flowchart showing a flow of image analysis processing.

The image analysis processing (S508) that is performed by the image processing unit 432 of the MFP cooperative server 120 is explained in detail by using FIG. 9. FIG. 9 is a flowchart showing a flow of the image analysis processing that the MFP cooperative server 120 performs in the image processing unit 432. The processing by this flowchart is performed by the CPU 311 with a program code stored in the ROM 312 or the HDD 314 of the MFP cooperative server 120 being loaded onto the RAM 313.

As the premise of the image analysis processing, it is assumed that the results of the business form learning processing (S515) performed in the past are stored in the HDD 314. The image processing unit 432 reads the results of the business form learning processing as needed and utilizes them in the image analysis processing.

At S901, preprocessing (in the following, called "default preprocessing") is performed, which is necessary for applying the similar business form determination processing and the character recognition processing that follow for the input target image. It is desirable for the default preprocessing to be processing that functions effectively both in the similar business form determination processing and in the character recognition processing. By making the preprocessing common to the similar business form determination processing and the character recognition processing, it is possible to reduce the processing load compared to a case where dedicated preprocessing is performed for each of them. In the present embodiment, in the similar business form determination processing. to be described later, the arrangement information on a character area is utilized. Then, in order to obtain the arrangement information on a character area, a binary image obtained by binarizing a business form image is also necessary. The arrangement information on a character area and the binary image are information necessary also for the character recognition processing and it is possible to utilize them as they are also in the character recognition processing. The image for which the default preprocessing has been performed is utilized in the similar business form determination processing, and therefore, stored in advance in the HDD 314 of the MFP cooperative server 120.

As the default preprocessing, rotation correction processing of a target image is performed. In the rotation correction processing, a rotation angle is calculated and the rotation correction processing is performed by rotating an image by using the calculated rotation angle. The calculation of a rotation angle is performed by utilizing that character strings and lines within a business form image are arranged side by side in the horizontal direction in data before printing. For example, a rotation angle is calculated by projection histograms in a variety of directions being taken and an angle corresponding to a histogram whose peak and bottom oscillate considerably in a short period being selected. This is because in a case of projection in the correct direction, character strings of the same line and horizontal lines, such as ruled lines in the same direction, are voted to the same bin on the histogram and nothing is voted to the portion corresponding to the space between lines, and therefore, a large amplitude occurs in a period of the space between characters. For the angle calculated by the method so far, the orientation of a character is not taken into consideration, and therefore, uncertainty of 180 degrees exists. It is possible to determine the orientation of a character by using the degree of reliability of a character at the time of performing simple character recognition processing. Due to this, it is made possible to calculate angle information that also takes into consideration the orientation of a character.

Figure 11B:
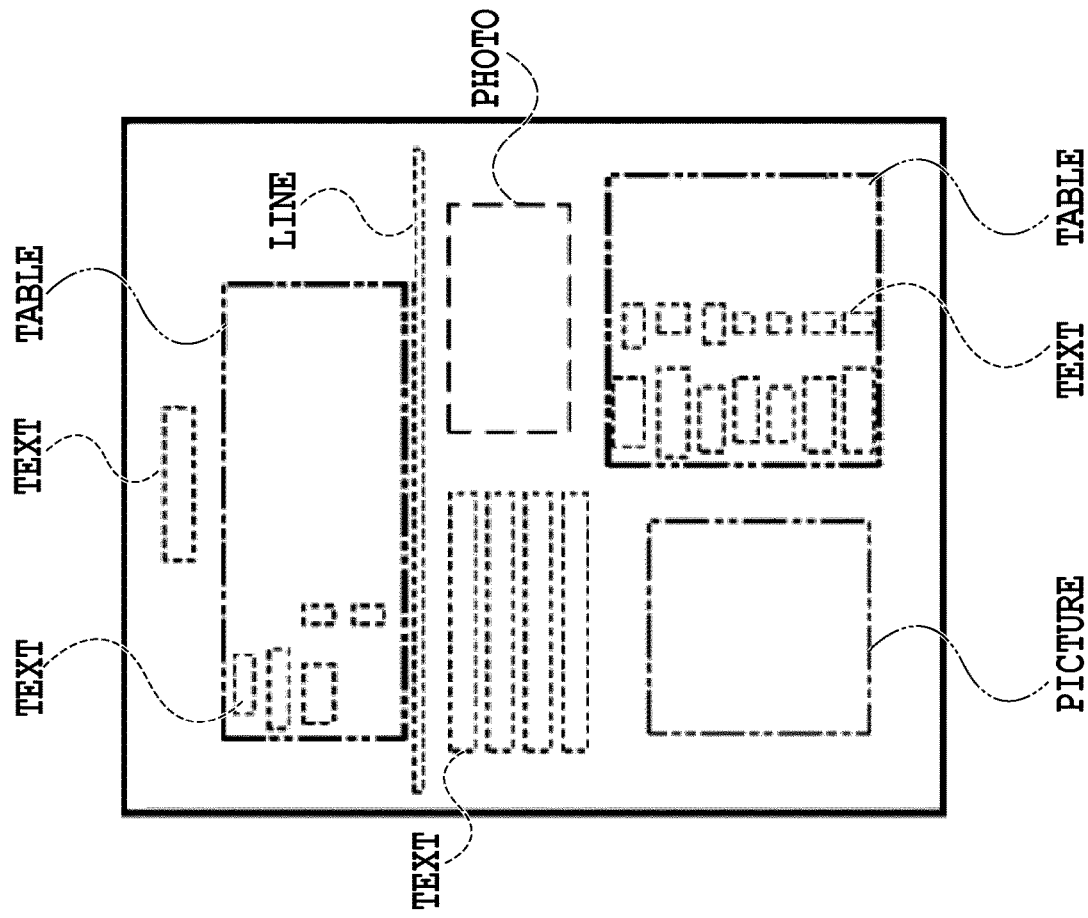
FIG. 11A and FIG. 11B are diagrams showing an example of block selection processing.
Figure 11A:
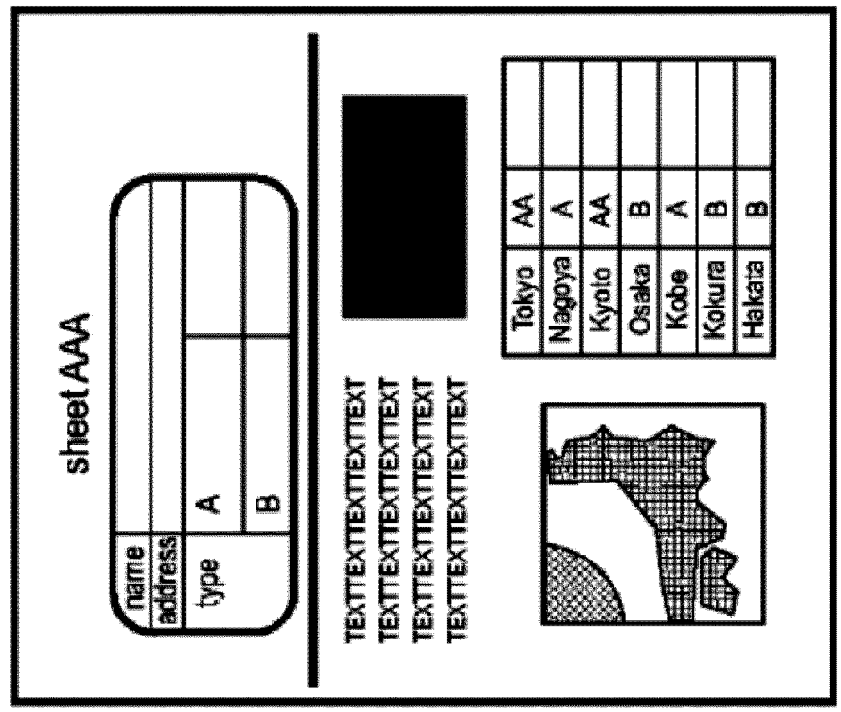

Next, analysis of a character area existing within the target image is performed. Because the analysis of a character area is performed, processing called block selection processing (BS processing) is performed. The block selection processing is processing to determine the attribute of each block by dividing an area within the target image into object blocks. A specific example is explained by using FIG. 11A and FIG. 11B. FIG. 11A is an example of a scanned image obtained by performing a scan at S505. FIG. 11B shows the results of dividing the scanned image into object blocks. FIG. 11B shows the way the attribute, such as TEXT, PICTURE, PHOTO, LINE, and TABLE, is determined for each of the blocks and the scanned image is divided into areas having different attributes. The method of the block selection processing is explained in the following. First, the scanned image is binarized into white and black. The binarization processing here is for the purpose of the analysis of a character area for the similar business form determination processing, and therefore, there is a possibility that it is not sufficient as the binarization processing for the character recognition processing for each individual character area. Further, it may also be possible to prevent a character area from becoming undetectable because the character area is in contact with the ruled line area by performing ruled line removal processing after the binarization processing. Next, contour tracking is performed and a pixel block surrounded by a black pixel contour is extracted. For the black pixel block whose area is larger than a predetermined area, the contour tracking is performed also for white pixels located inside the black pixel block and a white pixel block is extracted and further, a black pixel block is extracted recursively from the inside of the white pixel block whose area is larger than or equal to a predetermined area. The black pixel blocks thus obtained are classified according to size and shape and classified into areas having different attributes. For example, the pixel block whose aspect ratio is close to 1 and whose size is within a predetermined range is classified as a pixel block corresponding to a character. Further, the portion in which characters in close proximity to one another are aligned well and can be grouped is classified as a character area (TEXT). The flat pixel block is classified as a line area (LINE). The range whose size is larger than or equal to a predetermined size and which is occupied by the black pixel block including well-aligned rectangular white pixel blocks is classified as a table area (TABLE). The area in which irregularly shaped pixel blocks are dispersed is classified as a photo area (PHOTO). Then, the pixel block other than those described above and having an arbitrary shape is classified as a picture area (PICTURE). The attribute information on each block obtained by the block selection processing is used as information for the calculation of degree of similarity in the similar business form determination processing, to be described later, and the like.

At S902, the similar business form determination processing is performed. The similar business form determination processing is processing to determine whether there is a past business form image having a similar character area arrangement by comparing the arrangement information on the character area within the target image and the arrangement information on the past business form image. In the following, the registered past business form image is called "registered image". Here, as the registered image, one registered in the database of the HDD 314 by the business form learning processing (S515) described previously is used. In the database of the HDD 314, the arrangement information on the character area in the registered image and the information relating to the character area utilized by a user at the time of setting a file name are also registered. Here, the information relating to the character area includes, in addition to the arrangement information on each character area, information indicating whether or not it is possible to perform character recognition processing accurately for the character area by the default preprocessing (S901) alone (indicating whether or not additional preprocessing, to be described later, should be performed).

In the similar business form determination processing, first, the degree of similarity between the target image and each registered image is calculated and the registered image having the highest degree of similarity is obtained. Then, in a case where the highest degree of similarity is higher than or equal to a predetermined threshold value, it is determined that the business form relating to the target image and the business form relating to the registered image having the highest degree of similarity have the same document form. That is, in a case where the highest degree of similarity is higher than or equal to a predetermined threshold value, it is determined that the target image and the registered image having the highest degree of similarity are similar. In a case where the highest degree of similarity is not higher than the predetermined threshold value, it is determined that a registered image similar to the target image does not exists. As the information on the registered image, the arrangement information on the character area as the results or the like of the block selection processing in each business form image is supposed rather than the business form image itself, but the information is not limited thereto.

Here, an outline of matching processing between the target image and the registered image is explained by using FIG. 12A to FIG. 12F. FIG. 12A shows the target image and FIG. 12B and FIG. 12C each show the registered image. Between FIG. 12A and FIG. 12B, the arrangement of the character areas is similar and between FIG. 12A and FIG. 12C, the arrangement of the character areas is not similar. Because of this, in a case where the degree of similarity between FIG. 12A and FIG. 12B and the degree of similarity between FIG. 12A and FIG. 12C are calculated by utilizing an appropriate method, the former degree of similarity is higher, Because of this, as a result of the matching processing in this case, FIG. 12B is selected. Here, the concept of the calculation of degree of similarity using character areas is also explained. FIG. 12D is a diagram showing the character areas in FIG. 12A schematically. The area indicated by a dotted line is the character area and ID000 to ID004 are each an ID of each character area. That is, with reference to FIG. 12D, it is seen that the character area in which a character string is displayed in FIG. 12A is indicated by a dotted line. Similarly, FIG. 12E is a diagram showing the character areas in FIG. 12B schematically and FIG. 12F is a diagram showing the character areas in FIG. 12C schematically. As the method of calculating the degree of similarity using character areas, a method of calculating the degree of similarity by focusing attention on how similar the shape and arrangement of the character area are is used. The number of similar character areas is large in FIG. 12D and FIG. 12E. Specifically, ID000 in FIG. 12D and ID004 in FIG. 12E, ID001 in FIG. 12D and ID003 in FIG. 12E, ID002 in FIG. 12D and ID000 in FIG. 12E, and ID003 in FIG. 12D and ID001 in FIG. 12E are similar. Further, FIG. 12D and FIG. 12E are considered by performing position adjustment so that ID004 in FIG. 12D and ID005 in FIG. 12E are located at the same position. In this case, ID004 in FIG. 12D and ID005 in FIG. 12E, ID003 in FIG. 12D and ID002 in FIG. 12E, and ID002 in FIG. 12D and ID001 in FIG. 12E are similar. In FIG. 12D and FIG. 12F, the character areas that overlap somewhat exist, but the character area whose degree of similarity is high does not exist. Because of this, in a case where the degree of similarity between FIG. 12D and FIG. 12E and the degree of similarity between FIG. 12D and FIG. 12E are calculated, the former degree of similarity is higher. Here, the similar business form determination processing utilizing the arrangement information on the character area is explained, but it may also be possible to determine whether or not that target image and the registered image are similar by utilizing another information. For example, mention is made of an example in which whether or not the target image and the registered image are similar is determined by utilizing user information (personal ID, organization ID and the like) and character recognition information (character recognition results of the entire document, presence/absence of specific keyword, information on person name, company name, and title, and the like).

At S903, the processing is branched depending on whether or not it is determined that the registered image (similar business form image) similar to the target image exists. In a case where it is determined that a similar business form image does not exist, the processing advances to S904 and in a case where it is determined that a similar business form image exists, the processing advances to S906.

At S904, additional preprocessing for improving the accuracy in character recognition processing is performed for the target image. In the following, the additional preprocessing that is performed at this step is called "additional preprocessing". The additional preprocessing is processing that is not necessary for the similar business form determination processing but necessary for improving the accuracy of character recognition processing. The method of additional preprocessing may be any method of processing in which the character area that is the target of character recognition processing is extracted with a high accuracy and the accuracy of character recognition processing is improved. In the following, some examples of the additional preprocessing are shown.

The first example is binarization processing using threshold values different for each predetermined small area. In a case of a business form image created with only black characters, the foreground area (in a case where there are only characters, character area) and the background area are separated only by finding one threshold value for the entire business form image by utilizing Otsu's binarization and the like and performing binarization. However, in a case where there is a pale character area within the business form image, there is a possibility that the pale character area disappears by the binarization method such as this, and therefore, the character area is regarded as the background area. In such a case, by performing binarization processing using threshold values different for each predetermined small area, it is made possible to take the pale character area as a character area without disappearance of the pale character area. Even though the pale character is pale compared to another character, the area of the pale character is the area whose density is sufficiently high compared to that of the background of paper. Because of this, by focusing attention on the pale character and the area in which only the background of paper exists, binarization without disappearance of the pale character area is enabled. In this case, the small area is created by regularly dividing the business form image. Alternatively, in a case where a partial area of the non-white background, which has disappeared by the binarization processing in the default preprocessing (S901) is extracted and the pixel value distribution is such that it is possible to regard that a character area exists in the partial area, the partial area is taken as the small area. Here, the pixel value distribution such that it is possible to regard that a character area exists refers to the pixel value distribution such that two or more groups having similar pixel values exist. Further, conversely, in a case where a character is drawn on a background object whose density is higher than or equal to a predetermined density, there is a possibility that as a result of binarization, the entire object is binarized en bloc and the entire object is taken as the foreground. In such a case also, by performing the binarization processing using threshold values different for each predetermined small area, it is made possible to take only the character area as the foreground and take the background object area as the background area. Further, it may also be possible to find an inverted character area in which the density of the background object and that of the character are inverted and perform processing to invert the binarization results.

The second example is character area extraction processing utilizing a machine learning model of deep learning and the like. By extracting a character area based on binarization processing, it is possible to increase the speed of the processing, but even by combining the extraction with various noise removal methods, it is difficult to extract only the character area from the area having a complicated background, such as a background pattern. Further, by devising the learning method, it is also possible to expect that the area that is lost by the influence of shading is complemented. Consequently, a machine learning model of deep learning and the like is created and utilized, in which in a case where a business form image is input, only a character area is output directly. As the example in which a machine learning model is created, mention is made of an example in which a large number of business form images and images in which only character areas are extracted therefrom are prepared and a machine learning model is created by using a publicly known machine learning method with teacher.

The third example is advanced ruled line removal processing. The ruled line is utilized in a business form highly frequently, but the ruled line forms a large factor that reduces the accuracy of character recognition processing by the ruled line coming into contact with a character. Because of this, the ruled line removal processing is processing important in character recognition processing. After the rotation correction processing, it is possible to simply implement ruled line removal by detecting a straight line whose length in the vertical direction and in the horizontal direction is greater than or equal to a predetermined length and removing the straight line. However, in a case where the ruled line is short or in a case where the slopes of the ruled lines are different within the plane due to the inclination at the time of a scan or at the time of printing, it is not possible to remove the ruled lines correctly. Consequently, by performing the advanced ruled line removal processing, it is made possible to deal with a case as well where slopes of rued lines are different. In a case where the ruled line is short, it is important to remove only the ruled line without removing the line of a character. Consequently, by utilizing the results of the default preprocessing (S901), the place to which ruled line removal is applied locally is searched for and processing to remove a short ruled line as well is performed. The search condition is that the character area is larger than the peripheral character area, that the character area is surrounded by ruled line candidates, and the like. Depending on a case, it may also be possible to utilize the results of character recognition processing that has been performed, the degree of reliability in the results of the character recognition processing, and the character string existing around the character area for which the character recognition processing has been performed. In a case where slopes of ruled lines are different, it is sufficient to detect a straight line whose length is greater than or equal to a predetermined length and remove the straight line without limiting the direction only to one of the vertical direction and the horizontal direction. The detection method may be any method that takes into consideration the possibility of the contact with a character. For example, it is sufficient to perform detection and the like by using the probabilistic Hough transform and the like.

At S905, the character recognition processing is performed for all the character areas existing within the target image. For all the character areas that are the target of the character recognition processing at this step, the additional preprocessing (S904) has been performed. Further, the character recognition processing at this step is performed by using the publicly known subspace method capable of processing for each character area and the deep learning technique. Generally, by the character recognition processing, a value (degree of reliability) indicating the probability of being correct for each recognized character and information including a character string of a recognized character string candidate are obtained, together with the results of the character recognition processing. In the following, the information other than the character string obtained as the results of character recognition processing is called "character recognition-related information". It may also be possible to perform the character recognition processing at the step of the additional preprocessing (S904), perform additional image processing by utilizing the results of the character recognition processing and the character recognition-related information, and perform the character recognition processing again at this step. In a case where the processing at this step is completed, the processing advances to S912.

At S906, processing to extract the character area (recommendation-target area) within the target image corresponding to the character area utilized at the time of setting a file name to the similar business form image is performed. Explanation is given by supposing a case where, for example, the character area ID003 (see FIG. 12E) in the registered image in FIG. 12B is the character area utilized for setting a file name. In this case, the character area ID001 (see FIG. 12D) indicating the character area in FIG. 12A, which is the target image, is the character area corresponding to the character area ID003 and the character area ID001 is extracted as the recommendation-target area. That is, the recommendation-target area is extracted for each character area. The extraction such as this is performed for all the character areas utilized for setting of a file name and a recommendation-target area group is obtained.

At S907, whether or not the processing at S908 to S910 is performed for all the extracted recommendation-target areas is determined. In a case where there is an unprocessed recommendation-target area, the processing advances to S908. On the other hand, in a case where the processing is performed for all the recommendation-target areas, the processing advances to S911.

At S908, one character area in the extracted recommendation-target area group is taken as the processing target. Then, whether or not the one character area, which is taken as the processing target, is the character area for which it is possible to perform character recognition processing accurately by the default preprocessing alone (whether or not the one character area is the character area for which additional preprocessing, to be described later, should be performed) is determined. In the following, the one character area that is taken as the processing target is described as a "character area of interest". For the determination processing at this step, the information obtained by the similar business form determination processing (S902) is utilized. Specifically, first, the results of the business form learning processing in the similar business form image are referred to. Next, based on the information specifying the contents of the preprocessing that should be performed, which is registered in advance for the similar business form image, whether or not additional preprocessing is performed is determined. For example, in a case where a flag of "additionalProcessing" is generated for the character area in the similar business form image, it is determined that the additional preprocessing is performed for the recommendation-target area corresponding to the character area for which the flag is generated. On the other hand, in a case where the flag indicating that the additional processing is performed is not generated and "defaultProcessing" is "true", it is determined that the recommendation-target area is the character area for which it is possible to perform character recognition processing accurately by the default preprocessing alone. In a case where it is determined that the recommendation-target area of interest is the character area for which it is possible to perform character recognition processing accurately by the default preprocessing alone, the processing advances to S910. On the other hand, in a case where it is determined that the recommendation-target area of interest is the character area for which it is not possible to perform character recognition processing accurately by the default preprocessing alone, the processing advances to S909.

At S909, the additional preprocessing is performed for the recommendation-target area of interest. As the method of the additional preprocessing, the same method as that of the additional preprocessing performed at S904 is used. By doing so, the additional preprocessing is performed for only the character area for which the additional preprocessing is necessary among the character areas recommended by a user within the business form image, and therefore, compared to the case where the additional preprocessing is performed for all the character areas in the target image, the processing cost is reduced significantly. Then, for the character area that needs the additional preprocessing, the additional preprocessing is performed, and therefore, the accuracy of the character recognition processing is not reduced. Further, at this step, the analysis results of the similar business form image are referred to and the kind of additional preprocessing that is performed for the recommendation-target area of interest is limited and in a case where the kind has been obtained in the similar business form determination processing, only the limited kind of additional preprocessing is performed. For example, in a case where the kind of additional preprocessing that is performed at this step is limited to the "advanced ruled line removal processing" described previously, only the "advanced ruled line removal processing" is performed, and so on.

At S910, the character recognition processing is performed for the recommendation-target area of interest. In a case where the processing advances from S908 to S910, the character recognition processing is performed for the recommendation-target area for which the additional preprocessing has not been performed. That is, the character recognition processing is performed for the recommendation-target area for which only the default preprocessing has been performed. On the other hand, in a case where the processing advances from S909 to S910, the character recognition processing is performed for the recommendation-target area for which the additional preprocessing has been performed. As the method of the character recognition processing that is performed at this step, the same method as that of the character recognition processing performed at S905 is used. Further, in a case where the analysis results of the similar business form image are referred to and the character type, which is taken as the target of the character recognition processing, is specified and the specified character type is obtained by the similar business form determination processing (S902), the character recognition processing is performed by taking only the specified character type as a target. Here, the character type includes both information on the kind of character set, which is a set of numerals and alphabetical letters, and information on the kind of drawing method of a character, such as a printed character and a handwritten character. As a result of the character recognition processing, the character string, which is recommended information, to be described later, is recognized. For example, in a case where the character recognition processing is performed for the character area ID001 (see FIG. 12D) described previously, the character string of "ID9400" is recognized.

In a case where the processing for all the recommendation-target areas is completed, at S911, recommended information is generated. The recommended information is a property of a target image that is presented automatically to a user by utilizing the results of the character recognition processing performed for the recommendation-target area of interest. Specifically, by utilizing the results of the character recognition processing (S910) performed for the recommendation-target area of interest, a file name of the target image is generated. As the example of information that is utilized, mention is made of information that is stored in one of "rectInfoArray" and "metadataArray" in FIG. 8.

At S912, analysis results of the image analysis processing for the target image are generated. As the example of analysis results that are generated, mention is made of the data structure in FIG. 8. In a case where the processing advances from S905 to S912, data of ' "matched": false' is stored. The contents of "rectInfoArray" and "metadataArray" or one of those pieces of information become empty, or data is not stored therein and the results of the character recognition processing (S905) are stored in "ocrResultArray". In a case where the processing advances from S911 to S912, data of '"mathed": true' is stored. Further, in "rectInfoArray" and "metadataArray", the data generated at S911 is stored. As regards the data of "ocrResultArray", all the data of the character area, which is generated by the default preprocessing (S901), is stored. As regards the results of the character recognition processing, the data of only the character area for which the character recognition processing (S910) has been performed is stored.

The above is the details of the processing of the image analysis processing (S508).

<Details of Business Form Learning Processing>

Figure 10:
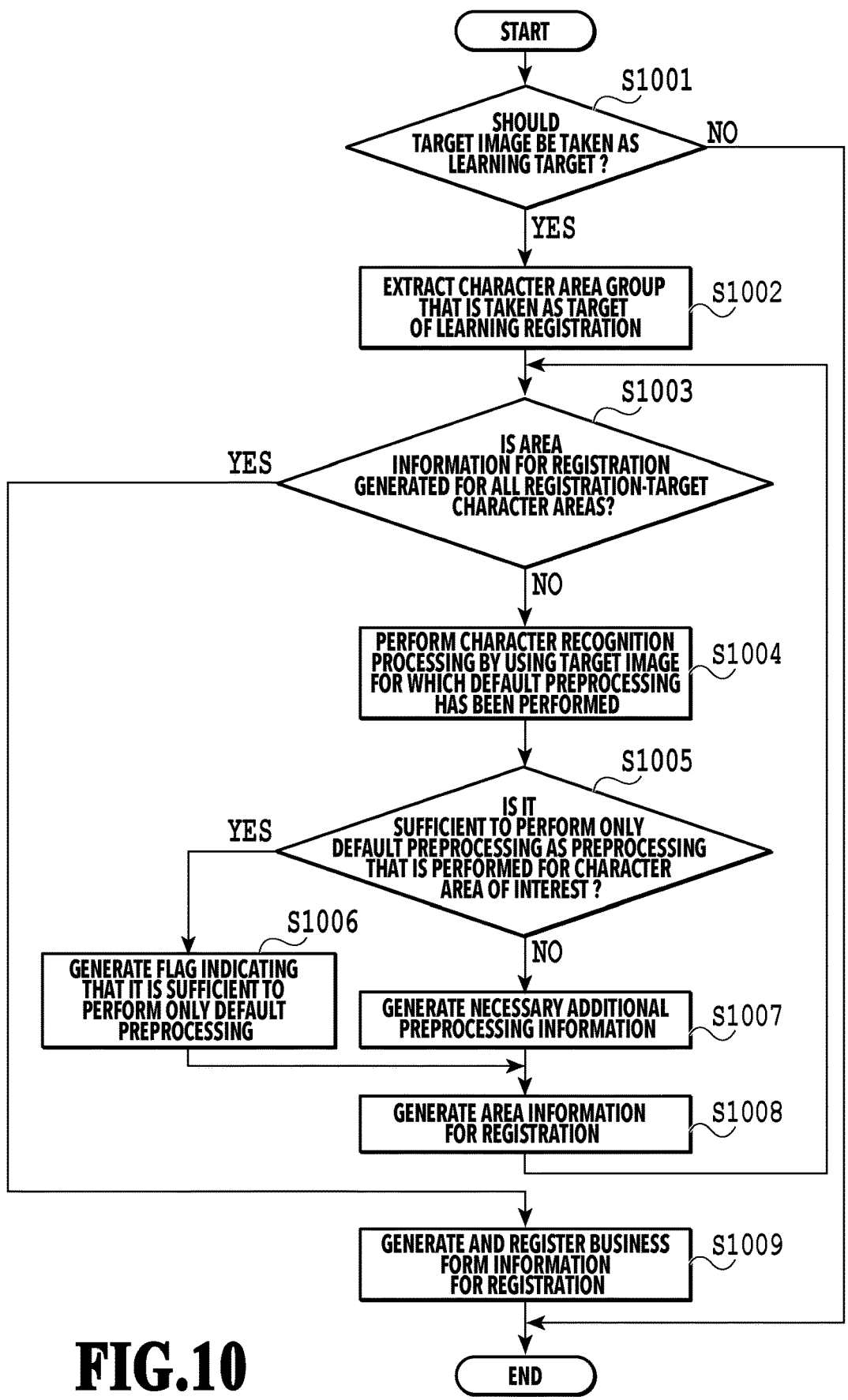
FIG. 10 is a flowchart showing a flow of business form learning processing.

The business form learning processing (S515) that is performed by the image processing unit 432 of the MFP cooperative server 120 is explained in detail by using FIG. 10. FIG. 10 is a flowchart showing a flow of the business form learning processing that the MFP cooperative server 120 performs in the image processing unit 432. The processing by this flowchart is performed by the CPU 311 with a program code stored in the ROM 312 or the HDD 314 of the MFP cooperative server 120 being loaded onto the RAM 313.

At S1001, business form information for learning registration in the target image is obtained and whether or not the target image should be taken as a learning target is determined. The business form information that is obtained at this step is the results of the image analysis processing (S508), information on the character area within the target image, which is obtained at S513 and used as a file name by a user, and character information. There is a possibility that the character information is set by manual input of a user. Further, the specific data structure of the business form information that is obtained at this step may be a data structure equivalent to the data structure in FIG. 8, in which a user operation is reflected in "rectInfoArray" and "metadataArray". Furthermore, in the business form information that is obtained at this step, "formId" and the like are also included.

Next, whether or not the target image should be taken as the learning target is determined. The target image that is taken as the learning target is the target image for which it has not been possible to recommend a property to a user or the target image for which recommendation of a property has failed. That is, the target image that is taken as the learning target is the target image for which it has been determined that no similar business form image exists at S903 or the target image for which a user has modified the recommended file name candidate by manual input on Edit Screen 710. As regards the target image for which it has been determined that no similar business form image exists, in the data structure in FIG. 8, the value of "formId" is empty. On the other hand, as regards the target image for which a user has performed modification, the character area within the target image for recommendation, which is generated at S508, and the results of the character recognition processing, and the character area within the target image, which is received at S513 and used as a file name by a user, and the character information are different. That is, the target image for which the value of "formId" is empty or the target image for which the file name displayed (recommended) in the File Name field 708 is wrong is taken as the learning target. In a case where it is determined that the target image is the learning target, the processing advances to S1002. On the other hand, in a case where it is determined that the target image is not the learning target, the business form learning processing is terminated.

At S1002, the character area that is taken as the target of learning registration is extracted. For example, in a case of the data structure in FIG. 8, arrangement information for each target area, which is stored in "rectInfoArray", is extracted. The extraction such as this is performed for all the character areas in the target image and a character area group that is taken as the target of learning registration is obtained.

At S1003, whether or not the processing at S1004 to S1008, to be described later, is performed for the character area group extracted at S1002 is determined. Specifically, whether or not area information for registration is generated for all the character areas that are taken as the registration target is determined. Here, the area information is information registered for each character area and indicating whether the preprocessing that is performed for the character area of interest may be only the default preprocessing and whether the additional preprocessing is also necessary. In a case where there is a character area for which the area information for registration is not generated yet, the processing advances to S1004. On the other hand, in a case where the area information for registration is generated for all the character areas that are taken as the registration target, the processing advances to S1009.

At S1004, one character area in the registration-target character area group obtained at S1003 is taken as the processing target. Then, for the processing-target character area, character recognition processing is performed by using the target image after the default preprocessing (S901). As regards the target image for which character recognition processing is performed, the target image stored in the HDD 314 of the MFP cooperative server 120 is read and utilized at that time of the default preprocessing. The method itself of character recognition processing is the same as the method of the character recognition processing (S905), but the former method differs from the latter method in that the processing target is the target image after the default preprocessing (S901).

At S1005, whether or not the character area of interest is the character area for which it is possible to perform character recognition processing accurately by the default preprocessing alone (whether or not the character area of interest is the character area for which additional preprocessing should be performed) is determined. For the determination at this step, the results of the character recognition processing (S1004) for the character area of interest and the character information obtained at the step (S1001) at which whether or not the target image should be taken as the learning target is determined are utilized. In the following, the character information obtained at S1001 is called a "target character string". The target character string is character information on the character area within the scanned image, which is obtained at S513 and used as a file name by a user, and it is possible to regard the target character string as the character string checked as the correct character string by the user. In a case where the target character string and the character string recognized by the character recognition processing at S1004 match with each other, it is determined that the character area of interest is the character area for which it is possible to perform character recognition processing accurately by the default preprocessing alone and the processing advances to S1006. On the other hand, in a case where the target character string and the character string recognized by the character recognition processing at S1004 do not match with each other, it is determined that the character area of interest is the character area for which it is not possible to perform character recognition processing accurately by the default preprocessing alone (that the character area of interest is the character area for which the additional preprocessing is also necessary) and the processing advances to S1007.

At S1006, a flag indicating that the character area of interest is the character area for which it is possible to perform character recognition processing accurately by the default preprocessing alone is generated.

At S1007, additional preprocessing information for the target character string to be output as the results of character recognition processing is generated. In a case where all the kinds of additional preprocessing are performed, the possibility that the target character string is obtained as the results of the character recognition processing becomes strong, but on the other hand, there is also a possibility that the kind of additional preprocessing that is not necessary exists and in a case where the additional preprocessing that is not necessary is performed as well, an increase in the processing cost will result. Consequently, performing the character recognition processing for the character area of interest after performing a plurality of pieces of individual additional preprocessing is repeated and the additional preprocessing that is necessary is determined. In a case where all the kinds of additional preprocessing are combined, the number of combinations becomes extremely large, and therefore, it is sufficient to limit the individual additional preprocessing that is the target of combination by analyzing the individual additional preprocessing that affects the character area of interest.

At S1008, area information for registration is generated. An example of the area information for registration is explained by using FIG. 13. FIG. 13 is a diagram showing an example of the data structure of business form information for business form registration, which is generated by the image processing unit 432 in the present system. Here, "formId" is an area in which information similar to that in FIG. 8 is stored. Similarly, "metadataArray" and "ocrResultArray" are also areas in which information similar to that in FIG. 8 is stored. However, because of not being indispensable information in the present embodiment, the results of character recognition processing are not stored in "ocrResultArray", but it may also be possible to store the results of character recognition processing as needed. Then, "rectInfoArray" is area information for registration. Portions different from those of "rectInfoArray" in FIG. 8 are explained. First, "defaultProcessing" is a flag indicating that it is possible to perform character recognition processing by the default preprocessing alone at the time of performing character recognition processing and "additionalProcessing" is a flag indicating that the additional preprocessing is necessary at the time of performing character recognition processing. Then, in "additionalProcessing", data indicating the type of additional preprocessing that is necessary for the character area of interest at the time of performing additional preprocessing is also stored. In FIG. 13, the area in which "key" is "textRegion0" is an example of area information that is stored in a case where the processing advances from S1006 to S1008. Based on the flag generated at S1006, "defaultProcessing" is "true". In this example, the additional preprocessing is not necessary, and therefore, "additionalProcessing" is empty. In FIG. 13, the area in which "key" is "textRegion1" is an example of area information that is generated in a case where the processing advances from S1007 to S1008. Then, "defaultProcessing" is "false" and based on the additional preprocessing information generated at S1007, the area information is stored in "additionalProcessing". In this example, it is indicated that the additional preprocessing called "procA" and the additional preprocessing called "procC" are performed for this character area.

At S1009, business form information for learning registration is generated and the business form information for learning registration is registered. First, the business form information for learning registration is generated by combining the area information generated at S1008 and the business form information obtained at S1001. As a specific example of the business form information for learning registration, mention is made of the data structure in FIG. 13 described previously. By utilizing the data structure in FIG. 13, it is made possible to perform the similar business form determination processing (S902), the switching processing at S908, and the additional preprocessing at S909 in image analysis processing that is performed hereafter. Then, processing to register the generated information in the database of the HDD 314 in the MFP cooperative server 120 is performed. At this step, it may also be possible to display a check screen of the determination results at S1004 to S1008 (information on the default preprocessing and the additional preprocessing that are performed for each character area) so that a user can modify them as needed and register the modification results.

The above is the details of the business form learning processing (S515) in FIG. 5. As explained above, according to the series of flows in the present embodiment, data indicating whether only the default preprocessing is necessary or the additional preprocessing is also necessary is registered for each character area. Due to this, it is made possible to improve the accuracy of character recognition processing.

Modification Example 1

By the method according to the first embodiment, the accuracy of character recognition processing is improved, but the character recognition processing depends on the variation in quality of a scanned business form itself and the variation in image quality resulting from the variation in the MFP having performed the scan. Because of this, at the next time and later, there is a possibility that erroneous character recognition processing will result in a case where the character recognition processing is performed for a character area of a business form image similar to the business form image having the character area for which it has been determined that it is possible to perform character recognition processing accurately by the default preprocessing alone. In the present modification example, a method of solving the problem is explained. In the following, the present modification example is explained by focusing attention mainly on the portions different from those of the first embodiment. Specifically, the processing contents at S908 in the first embodiment are different. In the following a modification example of S908 is explained.

One character area in the recommendation-target area group obtained at S906 is taken as the processing target and this is common to the first embodiment and the present modification example. However, the method of determining whether or not the character area is one for which it is possible to perform character recognition processing by the default preprocessing alone is different. Specifically, in the first embodiment, in a case where the results of the business form learning processing of the similar business form image is referred to and the flag of "additionalProcessing" is generated, it is determined that the recommendation-target area of interest is the character area for which it is possible to perform character recognition processing by the default preprocessing alone. On the other hand, in the present modification example, by utilizing the individual identification number of the MFP obtained by the similar business form determination processing (S902), whether or not the recommendation-target area of interest is the character area for which it is possible to perform character recognition processing by the default preprocessing alone is determined.

In information that is obtained by the similar business form determination processing in the present modification example, there exists a list recording the individual identification number of the MFP capable of performing character recognition processing accurately by the default preprocessing alone for each character area, which is registered in a modification example (see FIGS. 14A and 14B) of business form learning processing, to be described later. Then, in a case where whether or not the recommendation-target area of interest is the character area for which it is possible to perform character recognition processing by the default preprocessing alone is determined, this list is referred to. Then, only in a case where the individual identification number of the MFP 110 having scanned the business form relating to the target image is included in the list, it is determined that the recommendation-target area of interest is the character area for which it is possible to perform character recognition processing accurately by the default preprocessing alone. In a case where it is determined that it is not possible to perform character recognition processing accurately by the default preprocessing alone for the recommendation-target area of interest as a result of the determination in the present modification example, the processing advances to S909. On the other hand, in a case where it is determined that it is possible to perform character recognition processing accurately by the default preprocessing alone for the recommendation-target area of interest, the processing advances to S910.

Due to this, it is made possible to prevent the occurrence of an error of character recognition processing by performing character recognition processing by performing only the default preprocessing for the business form image of the business form scanned by the MFP that is not the target of the additional preprocessing for each recommendation-target area of interest. That is, only the default preprocessing is performed for the recommendation-target area of interest for which the additional preprocessing is not necessary, and therefore, it is possible to optimize the preprocessing.

The above is the detailed explanation of the present modification example 1.

Modification Example 2

Figures 14, 14A:
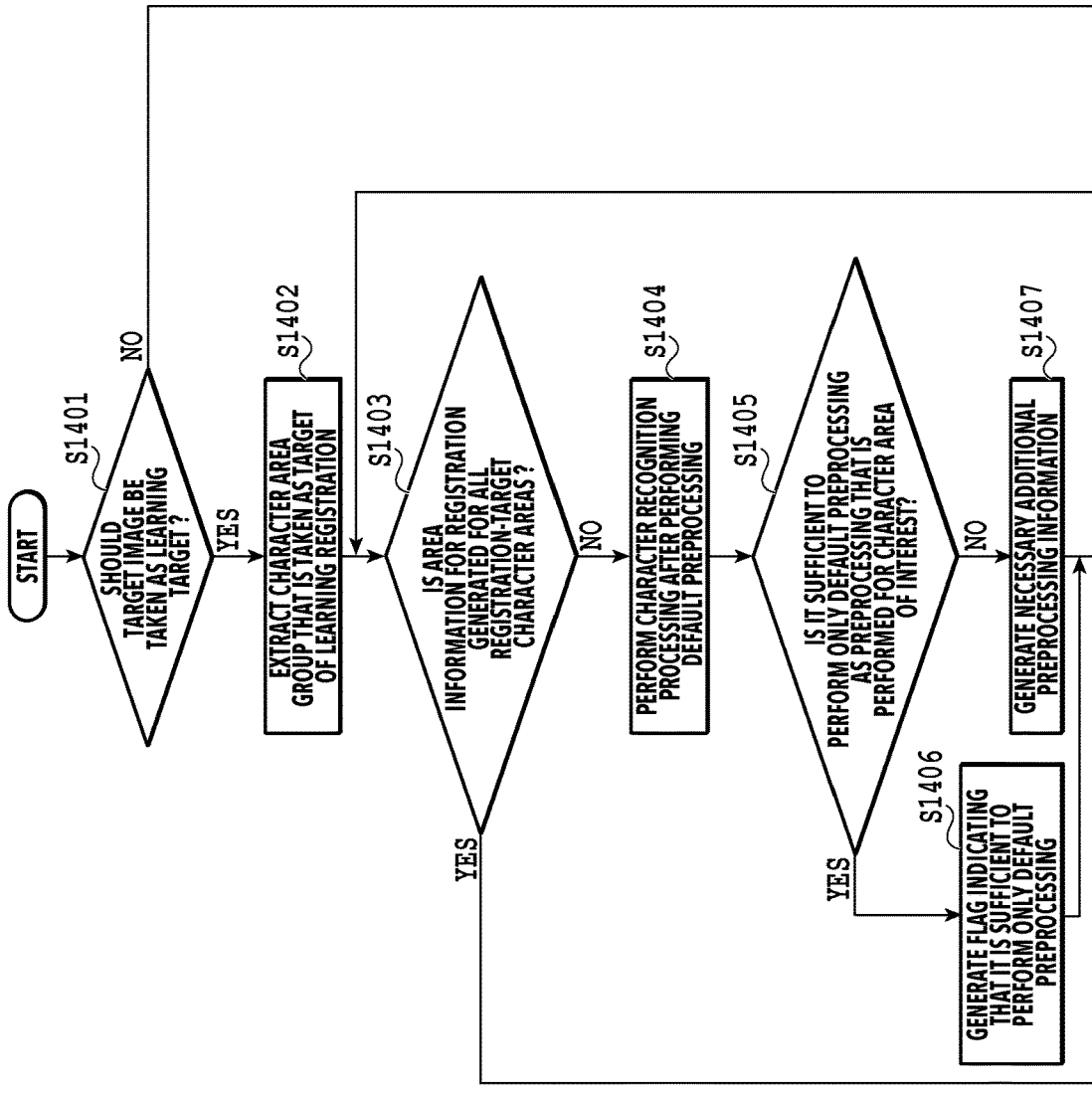
FIG. 14 is a diagram showing the relationship of FIGS. 14A and 14B.
FIGS. 14A and 14B are totally a flowchart showing a flow of business form learning processing.
Figure 14B:
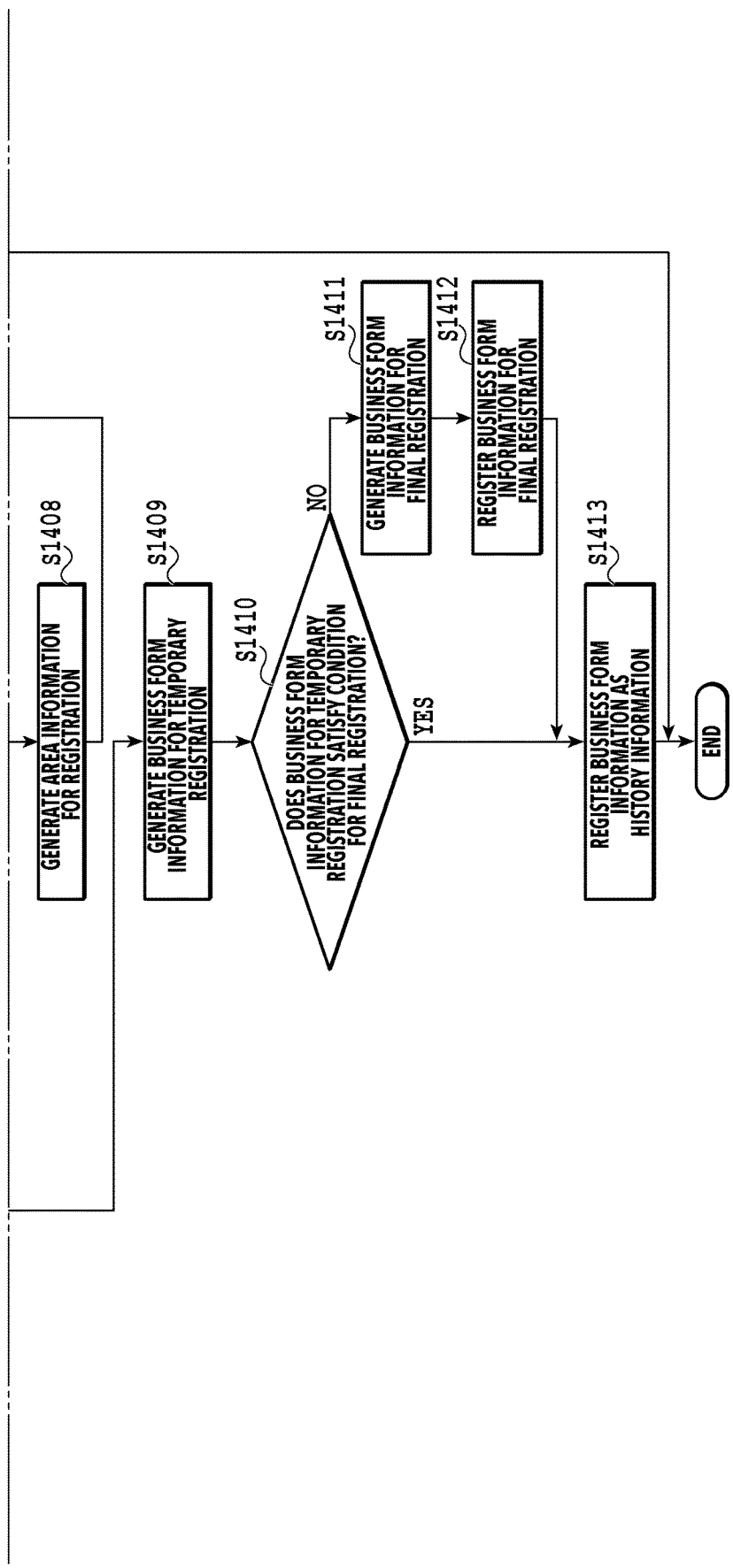

A modification example of the business form learning processing (S518) that is performed by the image processing unit 432 of the MFP cooperative server 120 is explained in detail by using FIGS. 14A and 14B. FIGS. 14A and 14B are totally a flowchart showing a flow of the business form learning processing that the MFP cooperative server 120 performs in the image processing unit 432. The processing by this flowchart is performed by the CPU 311 with a program code stored in the ROM 312 or the HDD 314 of the MFP cooperative server 120 being loaded onto the RAM 313. In the following, the present modification example is explained. Explanation of the configuration common to that of the first embodiment is omitted and portions different from those of the first embodiment are explained mainly. Specifically, the steps of S1401 and S1409 to S1413 are different from those of the first embodiment.

At S1401, business form information for learning registration on a learning-target business form is obtained and whether or not the target image is taken as the learning target is determined. At this step, in addition to the business form information that is obtained at S1001, past history information registered at S1404, to be described later, is also obtained. Then, the history information is associated with the type of business form. Specifically, history information on a registered image having the same value as the value of "formId" in the data structure in FIG. 8 is obtained. Then, in a case where the number of pieces of past history information is small, the target image is taken as the learning target. In a case where the number of pieces of history information is small, the amount of collected data is insufficient, and therefore, the learning flow of the present modification example is performed to increase the amount of registered history information. The concept that the number of pieces of history information is "small" does not mean simply only that the amount of information is small. For example, a case where the amount of history information registered within a predetermined time is small or a case where the ratio of target images taken as the learning target to the target images determined to be similar to the past registered image within a predetermined time is small, it is determined that the number of pieces of history information is "small". In addition, it may also be possible to perform learning to collect history in a case where a weight depending on an elapsed time is attached to history information so that a heavier weight is attached to the history information that is registered more recently and the amount of weight-attached history information is reduced and it is determined that the number of pieces of history information is "small". In a case where it is determined that the target image is taken as the learning target, the processing advances to S1402. On the other hand, in a case where it is not determined that the target image is taken as the learning target, the flow is terminated.

At S1402, data of the character area group, which is the target of learning registration, is extracted.

At S1403, whether or not all the character areas in the character area group extracted at S1402 are processed at the steps of S1404 to S1408, to be described later, is determined. In a case where it is determined that all the character areas in the extracted character area group are processed, the processing advances to S1409. On the other hand, in a case where it is determined that all the character areas in the extracted character area group are not processed, the processing advances to S1404.

At S1404, one character area in the registration-target character area group obtained at S1403 is taken as the processing target. Then, for the character area of interest, character recognition processing is performed by using the target image for which the default preprocessing has been performed.

At S1405, whether or not it is sufficient to perform only the default preprocessing as the preprocessing that is performed for the character area of interest is determined. In a case where it is sufficient to perform only the default preprocessing as the preprocessing that is performed for the character area of interest, the processing advances to S1406. On the other hand, in a case where it is not sufficient to perform only the default preprocessing as the preprocessing that is performed for the character area of interest and the additional preprocessing is also necessary, the processing advances to S1407.

At S1406, a flag indicating that the character area of interest is the character area for which it is possible to perform character recognition processing accurately by the default preprocessing alone is generated. At S1407, additional preprocessing information for the target character string to be output as the results of character recognition processing is generated. At S1408, area information for registration is generated.

At S1409, business form information for registration is generated. The business form information for registration is generated by combining the area information for registration generated at S1408 and the business form information obtained at S1401. As a specific example of the area information for registration, mention is made of the data structure in FIG. 13 described previously. The information for registration that is created at this step is information for temporary registration and the business form for final registration is generated at S1411, to be described later.

At S1410, whether or not the target image satisfies a condition for final registration is determined. That is, whether or not the information for temporary registration generated for the target image is information that can be registered finally is determined. In a case where a registered image similar to the target image is not registered, the target image is taken as the target of final registration unconditionally. In other cases, on a condition that a predetermined time has elapsed from the past final registration or on a condition that the amount of history information satisfies a reference, final registration processing is performed. Further, it may also be possible to advance to the final registration in order to update the history information at all times. In a case where it is determined that the condition for registration is satisfied, the processing advances to S1411. On the other hand, in a case where the condition for registration is not satisfied, the processing advances to S1413.

At S1411, business form information for final registration is generated. In a case where a registered image similar to the target image does not exist, it can be said that the target image is the business form image that is registered for the first time. Because of this, even for the character area determined to be the character area for which it is possible to perform character recognition processing accurately by the default preprocessing alone, it is not possible to determine whether character recognition processing can be performed both stably and accurately. Consequently, the flag indicating that it is possible to perform character recognition processing accurately by the default preprocessing alone is invalidated for all the character areas in the information for registration generated at S1408. Then, a flag indicating that the additional preprocessing is performed for all the character areas in the information for registration generated at 1408 is generated and the business form information is taken as the business form information for final registration. Alternatively, as regards the character area for which it seems possible to perform character recognition processing both stably and accurately, it may also be possible to leave the determination results at S1405. The character area for which it is possible to perform character recognition processing both stably and accurately is the character area whose reliability of character recognition processing is high, the character area with no background object, the character area with no different character area in the vicinity thereof, the character area whose character font size is large, and the like. In a case of the second and subsequent registration, whether or not the character area is one for which it is possible to perform character recognition processing both stably and accurately is determined from the past history information and based on the determination results, information for final registration is generated. Specifically, in all the history information corresponding to a plurality of times, the character area for which the flag indicating that it is possible to perform character recognition processing accurately by the default preprocessing alone has been generated has a strong possibility of being the character area for which it is possible to perform character recognition processing both stably and accurately. For the character area such as that, information for registration whose flag indicating that it is possible to perform character recognition processing accurately by the default preprocessing alone is validated is generated. Due to this, for the character area for which it can be expected to be capable performing character recognition processing both stably and accurately by the default preprocessing alone, the additional preprocessing is not performed, and therefore, it is possible to reduce the processing time and the processing cost of the additional preprocessing. Because of this, it is possible to perform optimization of the preprocessing while suppressing a reduction in accuracy of character recognition processing. Further, even for the character area for which the flag indicating that it is possible to perform character recognition processing accurately by the default preprocessing alone is generated only in part of the history information corresponding to a plurality of times, in a specific MFP, there is a case where the flag is generated at all times. In such a case, the individual identification number of the MFP is specified and information for registration whose flag indicating that it is possible to perform character recognition processing accurately by the default preprocessing alone is validated is generated for the character area of interest. In a case where there is not processing to specify an MFP such as this, on a condition that there is even one MFP whose correction-target image characteristic is not good, it becomes necessary to perform the additional preprocessing at all times, which is for correcting the image characteristic largely depending on the characteristic of the MFP that performs a scan. By introducing the MFP specifying processing such as this, it is made possible to limit the character area that is taken as the target of the additional preprocessing. At the time of the login processing (S503), the individual identification number of the MFP 110 is obtained and as the individual identification number that is utilized at this step, the individual identification number that is obtained at the time of the login processing is utilized.

At S1412, the business form information for final registration generated at S1411 is registered in the database of the HDD 314 in the MFP cooperative server 120. By the business form information for final registration registered in this manner being utilized, it is made possible to perform the similar business form determination processing (S902), the switching processing of the modification example 1 (modification example of S908), and the additional preprocessing (S909).

At S1413, the business form information generated at S1409 is stored as history information in association with the ID indicating the type of business form. As an example of the ID indicating the type of business form, mention is made of the value of "formId" in the data structure in FIG. 13.

The above is the detailed explanation of the present modification example. As explained above, by the series of flows in the present modification example, in addition to the effects of the first embodiment, by making a practical use of past history information, it is made possible to optimize preprocessing while suppressing a reduction in character recognition performance. Further, by specifying an MFP, it is also made possible to optimize preprocessing. Due to this, preprocessing is optimized and it is made possible to provide a service of higher quality.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to improve accuracy of character recognition processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-064177, filed Apr. 5, 2021 which is hereby incorporated by reference wherein in its entirety.

What is claimed is:

1. An image processing apparatus having a scan function, the image processing apparatus comprising:
at least one memory that stores a program; and
at least one processor that executes the program to perform:
obtaining a first image by performing a first preprocessing for a scanned image obtained by reading a document;
first determining whether information of a registered image similar to the first image is already registered in a database;
obtaining a second image by performing a second preprocessing for the first image in a case where it is determined that the information of the registered image similar to the first image is not registered in the database;
performing a character recognition processing for each character area within the second image
setting a property of the scanned image by using first results of the character recognition processing performed for at least one character area selected within the second image;
performing a character recognition processing for the at least one character area within the first image to obtain second results of the character recognition processing for the at least one character area;
second determining, based on the first results and the second results, whether each of the at least one character area is a character area for which the second preprocessing should be performed; and
registering, as information of a new registered image, information of the scanned image to the database, wherein the registered information of the new registered image includes information indicating whether each of the at least one character area is a character area for which the second preprocessing should be performed.

2. The image processing apparatus according to claim 1, wherein
in a case where it is determined that the information of the registered image similar to the first image is already registered in the database, the at least one processor executes the program to further perform:

determining, based on the registered information of the registered image similar to the first image, whether or not each of the at least one character area within the first image is a character area for which the second preprocessing should be performed;

performing the second preprocessing and the character recognition processing for a character area which is determined as the character area for which the second preprocessing should be performed; and performing the character recognition processing without the second preprocessing for a character area which is not determined as the character area for which the second preprocessing should be performed.

3. The image processing apparatus according to claim 1, wherein in the second determining, it is determined based on the first results, the second results and character strings used as the property of the scanned image, whether each of the at least one character area is the character area for which the second preprocessing should be performed.

4. The image processing apparatus according to claim 1, wherein the second preprocessing is binarization processing using a plurality of threshold values different for a plurality of areas.

5. The image processing apparatus according to claim 1, wherein the second preprocessing is processing to extract a character area by utilizing a machine learning model.

6. The image processing apparatus according to claim 1, wherein the second preprocessing is processing to remove a ruled line within an image.

7. A control method of an image processing apparatus having a scan function, the control method comprising:

a first obtaining step of obtaining a first image by performing a first preprocessing for a scanned image obtained by reading a document;

a first determining step of first determining whether information of a registered image similar to the first image is already registered in a database;

a second obtaining step of obtaining a second image by performing a second preprocessing for the first image in a case where it is determined that the information of the registered image similar to the first image is not registered in the database;

a character recognition step of performing a character recognition processing for each character area within the second image;

a setting step of setting a property of the scanned image by using first results of the character recognition processing performed for at least one character area selected within the second image;

a character recognition step of performing a character recognition processing for the at least one character area within the first image to obtain second results of the character recognition processing for the at least one character area;

a second determining step of second determining, based on the first results and the second results, whether each of the at least one character area is a character area for which the second preprocessing should be performed; and a registering step of registering, as information of a new registered image, information of the scanned image to the database, wherein the registered information of the new registered image includes information indicating whether each of the at least one character area is a character area for which the second preprocessing should be performed.

8. A non-transitory computer readable storage medium storing a program for causing a computer to perform a control method of an image processing apparatus having a scan function, the control method comprising:

a first obtaining step of obtaining a first image by performing a first preprocessing for a scanned image obtained by reading a document;

a first determining step of first determining whether information of a registered image similar to the first image is already registered in a database;

a second obtaining step of obtaining a second image by performing a second preprocessing for the first image in a case where it is determined that the information of the registered image similar to the first image is not registered in the database;

a character recognition step of performing a character recognition processing for each character area within the second image;

a setting step of setting a property of the scanned image by using first results of the character recognition processing performed for at least one character area selected within the second image;

a character recognition step of performing a character recognition processing for the at least one character area within the first image to obtain second results of the character recognition processing for the at least one character area;

a second determining step of second determining, based on the first results and the second results, whether each of the at least one character area is a character area for which the second preprocessing should be performed; and a registering step of registering, as information of a new registered image, information of the scanned image to the database, wherein the registered information of the new registered image includes information indicating whether each of the at least one character area is a character area for which the second preprocessing should be performed.

* * * * *